United States Patent
Dror et al.

(10) Patent No.: US 7,111,166 B2
(45) Date of Patent: Sep. 19, 2006

(54) EXTENDING THE RANGE OF COMPUTATIONAL FIELDS OF INTEGERS

(75) Inventors: Itai Dror, Omer (IL); Carmi David Gressel, Mobile Post Negev (IL); Michael Mostovoy, Beer Sheva (IL); Alexey Molchanov, Beer Sheva (IL)

(73) Assignee: Fortress U&T Div. M-Systems Flash Disk Pioneers Ltd., Omer (IL)

( * ) Notice: Subject to any disclaimer, the term of this patent is extended or adjusted under 35 U.S.C. 154(b) by 1161 days.

(21) Appl. No.: 09/854,853

(22) Filed: May 14, 2001

(65) Prior Publication Data

US 2002/0039418 A1   Apr. 4, 2002

(30) Foreign Application Priority Data

May 15, 2000   (IL) .................................. 136151
Nov. 14, 2000   (IL) .................................. 139674

(51) Int. Cl.
G06F 7/72   (2006.01)
H04K 1/00   (2006.01)

(52) U.S. Cl. .................. 713/174; 380/28; 380/46; 708/200; 708/490; 708/491; 708/503; 708/523; 708/629; 708/670; 708/800

(58) Field of Classification Search .............. 380/28, 380/46; 709/490–491; 713/174; 708/200, 708/490, 491, 503, 523, 629, 670, 800
See application file for complete search history.

(56) References Cited

U.S. PATENT DOCUMENTS

| 4,587,627 | A | 5/1986 | Omura et al. ............... 364/754 |
| 4,745,568 | A | 5/1988 | Onyszchuk et al. ........ 364/754 |
| 5,065,429 | A | 11/1991 | Lang |
| 5,073,870 | A | 12/1991 | Morita ........................ 364/746 |
| 5,144,574 | A | 9/1992 | Morita ........................ 364/746 |
| 5,206,824 | A | 4/1993 | Arazi ....................... 364/746.1 |
| 5,261,001 | A | 11/1993 | Dariel et al. ................. 380/30 |
| 5,448,639 | A | 9/1995 | Arazi .......................... 380/30 |
| 5,499,299 | A * | 3/1996 | Takenaka et al. ............. 380/28 |
| 5,513,133 | A * | 4/1996 | Cressel et al. .............. 708/620 |
| 5,544,246 | A | 8/1996 | Mandelbaum et al. |
| 5,742,530 | A | 4/1998 | Gressel et al. ............. 364/746 |
| 6,185,596 | B1 * | 2/2001 | Hadad et al. ............... 708/491 |
| 6,249,869 | B1 | 6/2001 | Drupsteen et al. |

FOREIGN PATENT DOCUMENTS

| EP | 0 502 782 A2 * | 9/1992 |
| WO | WO 98/48345 | * 10/1998 |
| WO | WO 98/50851 | 11/1998 |

OTHER PUBLICATIONS

C. Parr et al., "Fast Arithmetic for Public-Key Algorithms in Galois fields with Composite Exponents", *IEEE Transactions on Computers*, vol. 48, No. 10, Oct. 1999.

(Continued)

*Primary Examiner*—Taghi Arani
(74) *Attorney, Agent, or Firm*—Darby & Darby

(57) ABSTRACT

An extension of the serial/parallel Montgomery modular multiplication method with simultaneous reduction as previously implemented by the applicants, adapted innovatively to perform both in the prime number and in the $GF(2^q)$ polynomial based number field, in such a way as to simplify the flow of operands, by performing a multiple anticipatory function to enhance the previous modular multiplication procedures.

37 Claims, 12 Drawing Sheets

OTHER PUBLICATIONS

W. Wesley Peterson et al., *Error-Correcting Codes*, 2nd Edition, MIT Press, Cambridge, MA, 1972, pp. 174-179.

Lecture by Marco Bucci of the Fondazione Ugo Bordoni, Eurocrypt Conference Rump Session, Perugia, Italy, 1994.

The ST19-CF58 Device, produced by STMicroelectronics, Rousset, France.

D. Knuth, *The Art of Computer Programming, vol. 2: Seminumerical Algorithms*, Addison-Wesley, Reading, MA, 1981.

On May 16, 2001, an announcement was made at site www.security.ece.orst.edu of an U.S. Patent Application, filed on Feb. 29, 2000, entitled: A Scalable and Unified Multiplier for Finite Fields.

* cited by examiner

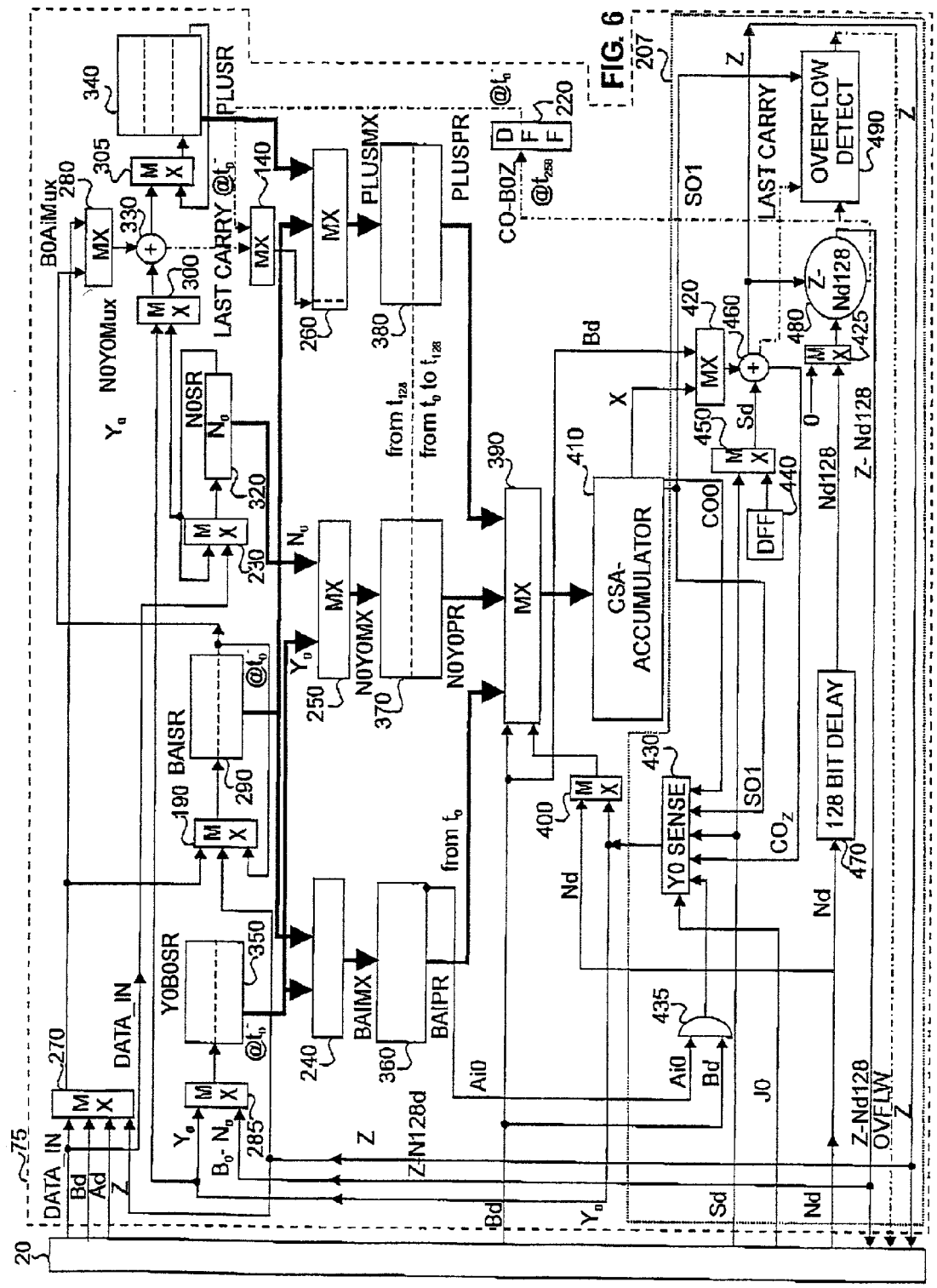

|   | $N_o$ | $N_o^{-1}$ | $-(N_o^{-1})$ |
|---|------|------|------|
| 1 | 0001 | 0001 | 1111 |
| 3 | 0011 | 1011 | 0101 |
| 5 | 0101 | 1101 | 0011 |
| 7 | 0111 | 0111 | 1001 |
| 9 | 1001 | 1001 | 0111 |
| 11 | 1011 | 0011 | 1101 |
| 13 | 1101 | 0101 | 1011 |
| 15 | 1111 | 1111 | 0001 |

$\mathcal{S} = 1$
GF(p)
$l = 4$

|   | $N_o$ | $N_o^{-1}$ | $-N_o^{-1}$ |
|---|------|------|------|
|   | 01 | 01 | 11 |
|   | 11 | 11 | 01 |

$\mathcal{S} = 1$
GF(p)
$l = 2$

|   | $N_o$ | $-N_o^{-1} = N_o^{-1}$ |
|---|------|------|
| 1 | 0001 | 0001 |
| 3 | 0011 | 1111 |
| 5 | 0101 | 0101 |
| 7 | 0111 | 1011 |
| 9 | 1001 | 1001 |
| 11 | 1011 | 0111 |
| 13 | 1101 | 1101 |
| 15 | 1111 | 0011 |

$\mathcal{S} = 0$
No Carry
GF($2^q$)
$l = 4$

|   | $N_o$ | $N_o^{-1}$ |
|---|------|------|
|   | 01 | 01 |
|   | 11 | 11 |

$\mathcal{S} = 0$
No Carry
GF($2^q$)
$l = 2$

FIG. 8A

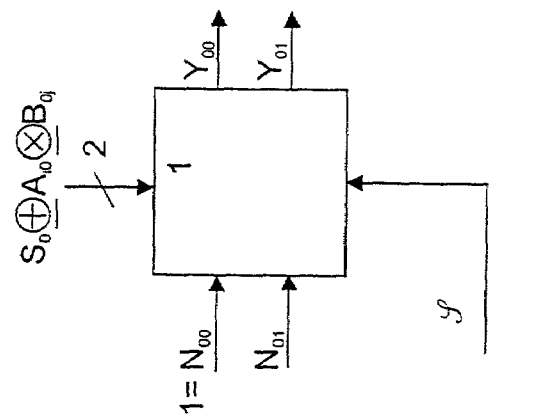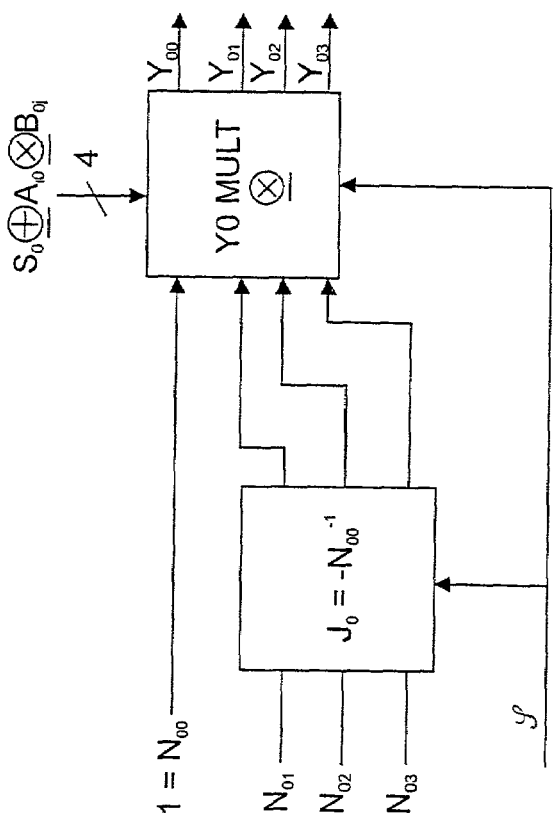
FIG. 8B

EXTENDING THE RANGE OF COMPUTATIONAL FIELDS OF INTEGERS

FIELD OF THE INVENTION

The present invention relates to apparatus operative to accelerate cryptographic co-processing peripherals and additionally but not exclusively to an accelerated processing apparatus for polynomial based and prime number field arithmetic, extending the range of computational fields of integers and width of serial input operands in modular arithmetic public key cryptographic coprocessors designed for elliptic curve and RSA type computations.

BACKGROUND OF THE INVENTION

Security enhancements and performance accelerations for computational devices are described in Applicant's U.S. Pat. No. 5,742,530, hereinafter "P1", U.S. Pat. Nos. 5,513,133, 5,448,639, 5,261,001; and 5,206,824 and published PCT patent application PCT/IL98/00148 (WO98/50851); and corresponding U.S. patent application Ser. No. 09/050,958, hereinafter "P2", Onyszchuk et al's U.S. Pat. No. 4,745,568; Omura et al's U.S. Pat. No. 4,5877,627, and applicant's U.S. patent application Ser. No. 09/480,102; the disclosures of which are hereby incorporated by reference. Applicant's U.S. Pat. No. 5,206,824 shows an early apparatus operative to implement polynomial based multiplication and squaring, which cannot perform operations in the prime number field, and is not designed for interleaving in polynomial based computations. An additional analysis is made of an approach to use the extension field in polynomial based arithmetic in Paar, C., F. Fleischmann and P. Soria-Rodriguez, "Fast Arithmetic for Public-Key Algorithms in Galois Fields with Composite Exponents", IEEE Transactions on Computers, vol. 48, No. 10, October 1999, henceforth "Paar". W. Wesley Peterson and E. J. Weldon Jr., in the second edition of "Error-Correcting Codes", published by the MIT Press, Cambridge, Mass., 1972, pages 174–179, demonstrated circuits for performing division in the polynomial based residual number system $GF(2^q)$, hereinafter, "Peterson". Peterson's circuit can only be used in a device where the multiplier is exactly the length of the modulus. Typically, that would demand a device that would be more than twice as long as present devices, and would not be cost effective for compact implementations. It could not be used in interleaved implementations, and could not be useful where l is longer than 1, as he has not provided an anticipatory device for determining the $Y_0$ of a multibit character.

Whereas, Knuth [D. Knuth, *The art of computer programming*, vol. 2: *Seminumerical algorithms*, Addison-Wesley, Reading Mass., 1981] page 407, implies that using an ordinary division process on a single 1 bit character in polynomial based division, we can assume a method to anticipate the next character in the quotient, this invention discloses a method for anticipating the next character of a quotient deterministically using a logic configuration.

SUMMARY OF THE INVENTION

It is an aim of the present invention to provide a microelectronic specialized arithmetic unit operative to perform large number computations in the polynomial based and prime integer based number fields, using the same anticipating methods for simultaneously performing interleaved modular multiplication and reduction on varied radix multipliers.

A further aim of the invention also relates to a compact microelectronic specialized arithmetic logic unit, for performing modular and normal (natural, non-negative field of integers) multiplication, division, addition, subtraction and exponentiation over very large integers. When referring to modular multiplication and squaring using both Montgomery methods and a reversed format method for simplified polynomial based multiplication and squaring, reference is made to the specific parts of the device as a superscalar modular arithmetic coprocessor, or SMAP, or MAP or SuperMAP™, also as relates to enhancements existing in the applicant's U.S. patent pending Ser. No. 09/050,958 filed Mar. 31, 1998 and a continuation in part, Ser. No. 09/480, 102 filed on Jan. 10, 2000.

Preferred embodiments of the invention described herein provide a modular computational operator for public key cryptographic applications on portable Smart Cards, typically identical in shape and size to the popular magnetic stripe credit and bank cards. Similar Smart Cards as per applicant's technology of U.S. Pat. Nos. 5,513,133 and 5,742,530, and applicants above mentioned pending applications are being used in the new generation of public key cryptographic devices for controlling access to computers, databases, and critical installations; to regulate and secure data flow in commercial, military and domestic transactions; to decrypt scrambled pay television programs, etc. and as terminal devices for similar applications. Typically, these devices are also incorporated in computer and fax terminals, door locks, vending machines, etc.

The preferred architecture is of an apparatus operative to be integrated to a multiplicity of microcontroller and digital signal processing devices, and also to reduced instruction set computational designs while the apparatus operates in parallel with the host's processing unit.

This embodiment preferably uses only one multiplying device which inherently serves the function of two or three multiplying devices, basically similar to the architecture described in applicant's U.S. Pat. No. 5,513,133 and further enhanced in U.S. patent application Ser. No. 09/050,958 and PCT application PCT/IL98/0048. Using present conventional microelectronic technologies, the apparatus of the present invention may be integrated with a controlling unit with memories onto a smart card microelectronic circuit.

The main difference between hardware implementations in the polynomial based field, and in the prime number field, is that polynomial based additions and subtractions are simple XOR logic operations, without carry signals propagating from LS to MS. Consequently, there is no interaction between adjacent cells in the hardware implementation, and subtraction and addition are identical procedures. The earliest public notice that the authors are aware of was a short lecture by Marco Bucci of the Fondazione Ugo Bordoni, at the Eurocrypt Conference Rump Session in Perugia, Italy, in 1994, though, even then, this configuration was well known to engineers practiced in the art.

Previous applicant's apparati, described in P1 and P2, were typically prepared to efficiently compute elliptic curve cryptographic protocols in the GF(p) field. For use in the $GF(2^q)$ field, in this invention, we show that as there is no interaction between adjacent binary bits in the polynomial field, computations can be processed efficiently, simultaneously performing reduction and multiplication on a superscalar multiplication device without introducing Montgomery functions and Montgomery parasites. Multiplication in $GF(2^q)$ is performed as the computation machine preferably starts from the most significant partial products. Reduction is performed by adding as many moduli as are necessary to reset MS ones to zeroes. As there is no carry out, in these additions, results are automatically modularly reduced. In this invention polynomial computations are performed using the same architecture, wherein, in GF($2^q$) the operands are fed in MS characters first, wherein all internal carry signals are forced to zero. GF(p) computations are preferably executed as in P1 and P2, wherein LS characters are processed first and MS characters last.

The architecture has been extended to allow for a potentially faster progression, in that serial multipliers are 1 bit wide characters, and at each clock, an 1 bit character is emitted from the carry save accumulator, the CSA. This has somewhat complicated the anticipation process ($Y_0$), in that for single bit wide busses, an inversion of an odd number over a mod $2^x$ base is also an odd number, and the least significant bit of the multiplicand ($J_0$) was always a one. For both number fields, however the reduction process is identical, assuming the switch out of (suppression of) carries, if we remember that our only aim is to output a k character zero string, and we regard the $Y_0$ function only as a zero forcing vector.

The present invention also seeks to provide an architecture for a digital device, which is a peripheral to a conventional digital processor, with computational, logical and architectural novel features relative to the processes described in U.S. Pat. No. 5,513,133.

A concurrent process and a hardware architecture are provided, to perform modular exponentiation without division preferably with the same number of operations as are typically performed with a classic multiplication/division device, wherein a classic device typically performs both a large scale multiplication and a division on each operation. A particular feature of a preferred embodiment of the present invention is the concurrency of larger scale anticipatory zero forcing functions, the extension of number fields, and the ability to integrate this type unit for safe communications.

The advantages realized by a preferred embodiment of this invention result from a synchronized sequence of serial processes. These processes are merged to simultaneously (in parallel) achieve three multiplication operations on n character operands, using one multiplexed k character serial/parallel multiplier in n effective clock cycles, where the left hand final k characters of the result reside in the output buffer of the multiplication device. This procedure accomplishes the equivalent of three multiplication computations in both fields, as described by Montgomery, for the prime number field and the equivalent of two multiplications and a division process in GF($2^q$).

By synchronizing loading of operands into the SuperMAP and on the fly detecting values of operands, and on the fly preloading and simultaneous addition of next to be used operands, the apparatus is operative to execute computations in a deterministic fashion. All multiplication and exponentiation circuitry is preferably added which on the fly preloads, three first k character variables for a next iteration squaring sequence. A detection device is preferably provided where only two of the three operands are chosen as next iteration multiplicands, eliminating k effective clock cycle wait states. Conditional branches are replaced with local detection and compensation devices, thereby providing a basis for a simple control mechanism. The basic operations herein described are typically executed in deterministic time in GF(p) using a device described in U.S. Pat. No. 5,513,133 to Gressel et al or devices as by STMicroelectronics in Rousset, France, under the trade name ST19-CF58.

The apparatus of the present invention has particularly lean demands on external volatile memory for most operations, as operands are loaded into and stored in the device for the total length of the operation. The apparatus preferably exploits the CPU onto which it is appended, to execute simple loads and unloads, and sequencing of commands to the apparatus, whilst the MAP performs its large number computations. Large numbers presently being implemented on smart card applications range from 128 bit to 2048 bit natural applications. The exponentiation processing time is virtually independent of the CPU, which controls it. In practice, architectural changes are typically unnecessary when appending the apparatus to any CPU. The hardware device is self-contained, and is preferably appended to any CPU bus.

In general, the present invention also relates to arithmetic processing of large integers. These large numbers are typically in the natural field of (non-negative) integers or in the Galois field of prime numbers, GF(p), composite prime moduli, and polynomial based numbers in GF($2^q$). More specifically, preferred embodiments of the present invention seek to provide devices that can implement modular arithmetic and exponentiation of large numbers. Such devices are suitable for performing the operations of Public Key Cryptographic authentication and encryption protocols, which, in the prime number field work over increasingly large operands and which cannot be executed efficiently with present generation modular arithmetic coprocessors, and cannot be executed securely in software implementations. Preferably, the same general architecture is used in elliptic curve implementations, on integers, which are orders of magnitude smaller. Using the novel reverse mode method of multiplication, polynomial arithmetic is advantageous as generating zeroes does not encumber computations with the parasitic $2^{-n}$ factor.

The architecture offers a modular implementation of large operand integer arithmetic, while allowing for normal and smaller operand arithmetic enabled by widening the serial single character bus, i.e., use of a larger radix. Typically, this is useful for accelerating computations, for reducing silicon area for implementing the SuperMAP, and for generating a device of length compatible with popular Digital Signal Processors (DSP).

For modular multiplication in the prime and composite field of odd numbers, A and B are defined as the multiplicand and the multiplier, respectively, and N is defined as the modulus in modular arithmetic. N, is typically larger than A or B. N also denotes the composite register where the value of the modulus is stored. N, is, in some instances, typically smaller than A. A, B, and N are typically n characters long, where characters are typically one to 8 bits long. k the number of l bit characters in the size of the group defined by the size (number of cells) of the multiplying device. Similarly, in polynomial based GF($2^q$) computations, the modulus, N, is n bits long wherein the MS bit is a one (a monic), and the A, S and B operands are also, when properly reduced, n bits long. If a result of a GF($2^q$), computation is monic it is preferably "reduced" to a value with an MS zero, by XORing said result value with the modulus. In a preferred embodiment, as the first significant bit of a GF($2^q$) is formed in the reverse mode, the MAP can sense if the bit is a one, and perform the preferred reduction.

In the prime field, ≡, or in some instances =, is used to denote congruence of modular numbers, for example 16≡2 mod 7.16 is termed "congruent" to 2 modulo 7 as 2 is the remainder when 16 is divided by 7. When Y mod N≡X mod N; both Y and X may be larger than N; however, for positive X and Y, the remainders are identical. Note also that the congruence of a negative integer Y, is Y+u·N, where N is the modulus, and if the congruence of Y is to be less than N, u is the smallest integer which gives a positive result.

In $GF(2^q)$ congruence is much simpler, as addition and subtraction are identical, and normal computations typically do not leave a substantial overflow. For N=1101 and A=1001, as the left hand MS bit of A is 1, we must reduce ("subtract") N from A by using modulo 2 arithmetic, A XOR N=1001 XOR 1101=0100.

The Yen symbol, ¥, is used to denote congruence in a limited sense, especially useful in GF(p). During the processes described herein, a value is often either the desired value, or equal to the desired value plus the modulus. For example X¥2 mod 7. X can be equal to 2 or 9. X is defined to have limited congruence to 2 mod 7. When the Yen symbol is used as a superscript, as in $B^¥$, then $0 \leq B^¥ < 2N$, or stated differently, $B^¥$ is either equal to the smallest positive B which is congruent to $B^¥$, or is equal to the smallest positive congruent B plus N, the modulus. Other symbols, specific to this invention appear later in this summary.

When X=A mod N, X is defined as the remainder of A divided by N; e.g., 3=45 mod 7, and much simpler in $GF(2^q)$—1111 mod 1001≡0110.

In number theory, the modular multiplicative inverse of X is written as $X^{-1}$, which is defined by $X \cdot X^{-1}$ mod N=1. If X=3, and N=13, then $X^{-1}$=9, i.e., the remainder of 3·9 divided by 13 is 1 in GF(p).

For both number fields, we typically choose to compute the multiplicative inverse of A using the exponential function, e.g., $A^{-1}$ mod q≡$A^{q-2}$ mod q.

The acronyms MS and LS are used to signify "most significant" and "least significant", respectively, when referencing bits, characters, and full operand values, as is conventional in digital nomenclature, but in the reversed mode polynomial base, operands are loaded MS data first and LS last, wherein the bit order of the data word is reversed when loaded.

Throughout this specification N designates both the value N, and the name of the shift register which stores N. An asterisk superscript on a value, denotes that the value, as stands, is potentially incomplete or subject to change. A is the value of the number which is to be exponentiated, and n is the bit length of the N operand. After initialization when A is "Montgomery P field normalized" to $A^*$ ($A^*=2^n A$— explained in P1) $A^*$ and N are typically constant values throughout the intermediate step in the exponentiation. In $GF(2^q)$ computations where computations might be performed with the normal unreversed positioning of bits we would be bound by this same protocol. However, using the reversed format, our computations generate most significant zeroes, which are disregarded, and do not represent a multiplication shift, as there is no carry out.

During the first iteration, after initialization of an exponentiation, B is equal to $A^*$. B is also the name of the register wherein the accumulated value that finally equals the desired result of exponentiation resides. S or $S^*$ designates a temporary value; and S designates the register or registers in which all but the single MS bit of a number in GF(p) S is stored. ($S^*$ concatenated with this MS bit is identical to S.) S(i−1) denotes the value of S at the outset of the i'th iteration. In these polynomial computations there is no need to perform modular reduction on S.

Typically, Montgomery multiplication of X and Y in the prime number field is actually an execution of $(X \cdot Y \cdot 2^{-n})$ mod N, where n is typically the number of characters in a modulus. This is written, $\mathcal{P}(A \cdot B)N$, and denotes MM or multiplication in the P field. In the context of Montgomery mathematics, we refer to multiplication and squaring in the P field and in the polynomial based field as multiplication and squaring operations.

We will redefine this innovative extension of a Montgomery type arithmetic in the $GF(2^q)$ to mean a reversed format data order, wherein MS zero forcing does not change congruence, or initiate a burdensome parasitic factor. We may thus introduce a new set of symbols to accommodate the arithmetic extension, and to enable an architecture with wider serial multiplier buses. Such a more than one bit serial multiplier stream is preferable for enabling a natural integer superscalar multiplier. Such multiplier device may accept 32 bit multiplicands and 4 bit multipliers, into an apparatus that can perform modular arithmetic multiplications and reductions simultaneously.

Symbols in the Serial/Parallel Super Scalar Modular Multiplier Enhancement l Number of bits in a character (digit).
r Radix of multiplier character, $r=2^l$.
n Size of operands (multiplier, multiplicand and modulus) in characters. In the demonstration of the computations in the GF(p) field of Montgomery arithmetic, l is equal to one, and n is the bit length of the modulus operand.
k Length of serial-parallel multiplier in characters.
m Number of interleaved slices (segments) of multiplicand: m=n/k.
$S_i$ Partial product result of i'th MM iteration; $0 \leq i \leq m-1$; $S_0=0$.
$S_{i0}$ Right hand character of the i'th iteration result, after disregarding the first k character right hand zeroes of Z.
$\underline{S}_i$ The left hand n−k characters of the i'th result.
$S_{ij}$ j'th character of $S_i$.
A Parallel multiplicand consists of m·k characters.
$A_i$ The i'th k character slice of A, (and/or register storing $A_i$)
$A_{it}$ The t'th character of $A_i$.
B A serial multiplier (and/or register store of B).
$B_0$ First right hand k characters of B.
$\underline{B}$ Last left hand (n−k) characters of B.
$B_{0j}$ j'th character of $B_0$.
$\underline{B}_j$ j'th character of $\underline{B}$.
N Modulus operand. (and/or register storing said multiplier).
$N_0$ The Right Hand k characters of N. {the LS characters in GF(p); MS characters in $GF(2^q)$}
$\underline{N}$ (n−k) Left Hand characters of N. {MS characters in GF(p); LS characters in $GF(2^q)$}
$N_{0j}$ j'th character of $N_0$.
$\underline{N}_j$ j'th character of $\underline{N}$.
$Y_0$ Zero forcing variable required for both Montgomery multiplication and reduction in GF(p). $Y_0$ is k characters long.
$Y_{0j}$ j'th character of $Y_0$.
R A summation of the value residing in the Carry Save Accumulator, (includes unresolved internal carry ins) and the carry out bit from the final serial summator, 460.
$J_{00}$ Zero forcing character function of the modulus, N, for "on the fly" finite field multiplication and reduction. For l=1, $J_{00}$ is always equal to 1.
$Carry_j$ j'th internal carry character of radix r serial-parallel multiplier.
$Carry_a$ radix r carry of output serial adder for GF(p) computations.
$Sum_j$ j'th internal sum character of radix r serial-parallel multiplier.
LS Least Significant.

MS Most Significant.

‖ Concatenation, e.g. A=110, B=1101 ; A‖B=1101101.

Right Hand A Least Significant portion of all GF(p) computation data blocks and an MS portion of the reversed $GF(2^q)$ format.

Left Hand A Most Significant portion of all GF(p) computation data blocks and an LS portion of the reversed $GF(2^q)$ format.

GF(p) Galois Field, strictly speaking finite fields over prime numbers where we also use composite integers (product of two very large prime numbers) that allow for addition, subtraction, multiplication and pseudo-division.

$GF(2^q)$ Galois Fields finite fields using modulo 2 arithmetic.

⊕ An operator or device which may be externally switched to add or subtract integers with or without carries, as befits the specific number system.

ⓧ An operator or device which may be switched to either execute multiplication over GF(p) or multiplication over $GF(2^q)$.

$\mathscr{f}$ The number field switch, where if:

$\mathscr{f}$=1, the switch is operative to enable all carry in/outputs for GF(p) computations;

$\mathscr{f}$=0, the switch is operative to disable all carry in/outputs for $GF(2^q)$ computations.

SuperMAP Any one of a member of the proprietary Superscalar Modular Arithmetic Processor family that is the subject of this invention. The SuperMAP trademark is registered in Europe and is pending in the United States.

According to a first aspect of the present invention, there is therefore provided a microelectronic apparatus for performing ⓧ multiplication and squaring in both polynomial based $GF(2^q)$ and GF(p) field arithmetic, squaring and reduction using a serial fed radix $2^l$ multiplier, B, with k character multiplicand segments, $A_i$, and a k character ⊕ accumulator wherein reduction to a limited congruence is performed "on the fly", in a systolic manner, with $A_i$, a multiplicand, times B, a multiplier, over a modulus, N, and a result being at most 2n+1 characters long, including the k first emitting disregarded zero characters, which are not saved, where k characters have no less bits than the modulus, wherein said operations are carried out in two phases, the apparatus comprising;

a first (B), and second (N) main memory register means, each register operative to hold at least n bit long operands, respectively operative to store a multiplier value designated B, and a modulus, denoted N, wherein the modulus is smaller than $2^n$;

a digital logic sensing detector, $Y_0$, operative to anticipate "on the fly" when a modulus value is to be ⊕ added to the value in the ⊕ adder accumulator device such that all first k characters emitting from the device are forced to zero;

a modular multiplying device for at least k character input multiplicands, with only one, at least k characters long ⊕ adder, ⊕ summation device operative to accept k character multiplicands, the ⓧ multiplication device operative to switch into the ⊕ accumulator device, in turn, multiplicand values, and in turn to receive multiplier values from a B register, and an "on the fly" simultaneously generated anticipated value as a multiplier which is operative to force k first emitting zero output characters in the first phase, wherein at each effective machine cycle at least one designated multiplicand is ⊕ added into the ⊕ accumulation device;

the multiplicand values to be switched in turn into the ⊕ accumulation device consisting of one or two of the following three multiplicands, the first multiplicand being an all-zero string value, a second value, being the multiplicand $A_i$, and a third value, the $N_0$ segment of the modulus;

an anticipator to anticipate the l bit k character serial input $Y_0$ multiplier values;

the apparatus being operable to input in turn multiplier values into the multiplying device said values being first the B operand in the first phase, and concurrently, the second multiplier value consisting of the $Y_0$, "on the fly" anticipated k character string, to force first emitting zeroes in the output;

the apparatus further comprising an accumulation device, ⊕, operative to output values simultaneously as multiplicands are ⊕ into the ⊕ accumulation device;

an output transfer mechanism, in the second phase operative to output a final modular ⓧ multiplication result from the ⊕ accumulation device.

According to a preferred embodiment ⊕ summations into the ⊕ accumulation device are activated by each new serially loaded higher order multiplier characters.

Preferably, the multiplier characters are operative to cause no ⊕ summation into the ⊕ accumulation device if both the input B character and the corresponding input $Y_0$ character are zeroes;

are operative to ⊕ add in only the $A_i$ multiplicand if the input B character is a one and the corresponding $Y_0$ character is a zero;

are operative to ⊕ add in only the N, modulus, if the B character is a zero, and the corresponding $Y_0$ character is a one; and are operative to ⊕ add in the ⊕ summation of the modulus, N, with the multiplicand $A_i$ if both the B input character and the corresponding $Y_0$ character are ones.

Preferably, the apparatus is operative to preload multiplicand values $A_i$ and N, into two designated preload buffers, and to ⊕ summate these values into a third multiplicand preload buffer, obviating the necessity of ⊕ adding in each multiplicand value separately.

Preferably, the multiplier character values are arranged for input in serial single character form, and wherein the $Y_0$ detect device is operative to anticipate only one character in a clocked turn.

In a preferred embodiment wherein the ⊕ accumulation device performs modulo 2 computations, XOR addition/subtraction, wherein all carry bits in addition and subtraction components are disregarded, thereby precluding provisions for overflow and further limiting convergence in computations.

Preferably, carry inputs are disabled to zero, denoted, $\mathscr{f}$=0, typically operative to perform polynomial based multiplication.

Preferably the apparatus is operative to provide non-carry arithmetic by omitting carry circuitry, such that an $\mathscr{f}$ equal to zero acting on an element in a circuit equation computing in $GF(2^q)$, $\mathscr{f}$ designates omitted circuitry and all adders and subtractors, designated ⊕ to XOR, modulo 2 addition/subtraction elements.

A preferred embodiment is adapted such that the first k character segments emitted from the operational unit are zeroes, being controlled by the following four quantities in anticipating the next in turn $Y_0$ character:

i. the l bit $S_{out}$ bits of the result of the l bit by l bit mod $2^l$ ⓧ multiplication of the right-hand character of the $A_i$ register times the $B_d$ character of the B Stream, $A_0 \cdot$ ⓧ $B_d$ mod $2^l$;

ii. the first emitting carry out character from the ⊕ accumulation device, $\mathscr{f}(CO_0)$;

iii. the l bit $S_{out}$ character from the second from the right character emitting cell of the ⊕ accumulation device, $SO_1$;

iv. the 1 bit $J_0$ value, which is the negative multiplicative inverse of the right-hand character in the $N_0$ modulus multiplicand register, wherein values, $A_0 \otimes B_d$ mod $2^l$, $\mathscr{S}(CO_0)$, and $SO_1$ are $\oplus$ added character to character together and "on the fly" multiplied by the $J_0$ character to output a valid $Y_0$ zero-forcing anticipatory character to force an l bit egressing string of zeroes.

The apparatus is preferably operable to perform multiplication on polynomial based operands performed in a reverse mode, multiplying from right hand MS characters to left hand LS characters, operative to perform modular reduced $\otimes$ multiplication without Montgomery type parasitic functions.

Preferably, the apparatus further comprises preload buffers which are serially fed and where multiplicand values are preloaded into the preload buffers on the fly from one or more memory devices.

The apparatus is preferably operative to $\oplus$ summate into a multiplication stream a previous value, emitting from an additional n bit S register, via an l bit $\oplus$ adder circuit such that first emitting output characters are zeroes when the $Y_0$ detector is operative to detect the necessity of $\oplus$ adding moduli to the $\oplus$ summation in the $\oplus$ accumulation device, wherein the $Y_0$ detector operates to detect, utilizing the next in turn $\oplus$ added characters $A_0 \otimes B_d$ mod $2^l$, $\mathscr{S}(CO_0)$, $SO_1$, $S_d$ and $\mathscr{S}(CO_z)$, the composite of $\oplus$ added characters to be finite field $\otimes$ multiplied on the fly by the l bit $J_0$ value, where $\oplus$ defines the addition and $\otimes$ defines the multiplication as befits the finite field used in the process.

Preferably, for l=1, $J_0$ is implicitly 1, and the $J_0$ $\otimes$ multiplication is implicit, without additional hardware.

Preferably, a comparator is operative to sense a finite field output from the $\otimes$ modular multiplication device, whilst working in GF(p), where the first right hand emitting k zero characters are disregarded, where the output is larger than the modulus, N, thereby operative to control a modular reduction whence said value is output from the memory register to which the output stream from the multiplier device is destined, and thereby precluding allotting a second memory storage device for the smaller product values.

Preferably, for $\otimes$ modular multiplication in the GF($2^q$), the apparatus is operative to multiply without an externally precomputed more than 1 bit zero-forcing factor.

A preferred embodiment is operative to compute a $J_0$ constant by resetting either the A operand value or the B operand value to zero and setting the partial result value, $S_0$, to 1.

According to a second aspect of the present invention there is provided a microelectronic apparatus for performing interleaved finite field modular multiplication of integers A and B, so as to generate an output stream of A times B modulus N, wherein a number of characters in a modulus operand register, n, is larger than a segment length of k characters, wherein the $\otimes$ multiplication process is performed in a plurality of interleaved iterations, wherein at each interleaved iteration with operands input into a $\otimes$ multiplying device, consisting of N, the modulus, B, a multiplier, a previously computed partial result, S, and a k character string segment of A, a multiplicand, the segments progressing from the $A_0$ string segment to the $A_{m-1}$ string segment, wherein each iterative result is $\oplus$ summated into a next in turn S, temporary result, in turn, wherein first emitting characters of iterative results are zeroes, the apparatus comprising:

first (B), second (S) and third (N) main memory registers, each register respectively operative to store a multiplier value, a partial result value and a modulus;

a modular multiplying device operative to $\oplus$ summate into the $\oplus$ accumulation device, in turn one or two of a plurality of multiplicand values, during each one of a plurality of phases of the iterative $\otimes$ multiplication process, and in turn to receive as multipliers, in turn, inputs from:

said B register, an "on the fly" anticipating value, $Y_0$, being usable as a multiplier to force first emitting right-hand zero output characters in each iteration, and said N, register;

the multiplicand parallel registers operative at least to receive in turn, values from the A, B, and N register sources, and in turn, also a multiplicand zero forcing $Y_0$, value;

the apparatus further utilizing the $Y_0$ detect device operative to generate a binary string operative to be a multiplier during the first phase and operative to be a multiplicand in the second phase;

the apparatus being operable to obtain multiplicand values suitable for switching into the $\oplus$ accumulation device for the first phase consisting of a first zero value, a second value, $A_i$, which is a k character string segment of a multiplicand, A, and a third value $N_0$, being the first emitting k characters of the modulus, N;

the apparatus further being operable to utilize a temporary result value, S, resulting from a previous iteration, operative to be $\oplus$ summated with the value emanating from the $\oplus$ accumulation device, to generate a partial result for the next-in-turn iteration;

the apparatus further being operable to utilize multiplicand values to be input, in turn, into the $\oplus$ accumulation device for a second multiplication phase being, comprising firstly a first zero value, a second $A_i$ operand, remaining in place from the first phase, and thirdly a $Y_0$ value having been anticipated in the first phase;

multiplier values input into the multiplying device in the first phase being firstly an emitting string, $B_0$, said multiplication device being operable to multiply said string segment concurrently $\otimes$ multiplying with a second $\otimes$ multiplier value consisting of the anticipated $Y_0$ string which is simultaneously loaded character by character as it is generated into a preload multiplicand buffer for the second phase;

the two multiplier values operative to be input into the apparatus during a second phase being left hand n–k character values from the B operand, designated $\underline{B}$. and the left hand n–k characters of the N modulus, designated $\underline{N}$, respectively; and wherein said apparatus further comprises a multiplying flush out device operative in a last phase to transfer the left hand segment of a result value remaining in the $\oplus$ accumulation device into a result register.

Preferably, the apparatus is operable to perform $\otimes$ multiplication on polynomial based operands is performed in a reverse mode, multiplying from MS characters to LS characters, operative to perform modular reduction without the Montgomery type parasitic functions, as in applicant's patent U.S. Pat. No. 5,742,530.

According to a third aspect of the present invention there is provided apparatus operative to anticipate a $Y_0$ value using first emitting values of the multiplicand, and present inputs of the B multiplier, carry out values from the $\oplus$ accumulation device, $\oplus$ summation values from the $\oplus$ accumulation device, the present values from the previously computed partial result, and carry out values from the ⊕ adder which ⊕ summates the result from the ⊕ accumulation device with the previous partial result.

Preferably, the apparatus is adapted to insure that k first emitting values from the device are zero characters said adaptation comprising anticipation of a next in turn $Y_0$ character using the following quantities:

i. the 1 bit $S_{out}$ bits of the result of the 1 bit by 1 bit mod $2^l$ ⊗ multiplication of the right-hand character of the $A_i$ register times the $B_d$ character of the B Stream, $A_0 \cdot B_d$ mod $2^l$;

ii. the first emitting carry out character from the ⊕ accumulation device, $\mathscr{S}(CO_0)$;

iii. the 1 bit $S_{out}$ character from the second from the right-hand character emitting cell of the ⊕ accumulation device, $SO_1$;

iv. the next in turn character value from the S stream, $S_d$;

v. the 1 bit carry out character from the Z output full adder, $\mathscr{S}(CO_z)$;

vi. the 1 bit $J_0$ value, which is the negative multiplicative inverse of the right-hand character in the $N_0$ modulus multiplicand register;

wherein values, $A_0 \cdot B_d$ mod $2^l$, $\mathscr{S}(CO_0)$, $SO_1$, $S_d$ are ⊕ added character to character together and "on the fly" ⊗ multiplied by the $J_0$ character to output a valid $Y_0$ zero-forcing anticipatory character.

In a further embodiment there is also provided at least one sensor operative to compare the output result to N, the modulus, the mechanism operative to actuate a second subtractor on the output of the result register, thereby to output a modular reduced value which is of limited congruence to the output result value precluding the necessity to allot a second memory storage for a smaller result.

In a yet further embodiment, a value which is a ⊕ summation of two multiplicands is loaded into a preload character buffer with at least a k characters memory means register concurrently whilst one of the first values is loaded into another preload buffer.

According to a fourth aspect of the present invention there is provided apparatus with one ⊕ accumulation device, and an anticipating zero forcing mechanism operative to perform a series of interleaved ⊗ modular multiplications and squarings and being adapted to perform concurrently the equivalent of three natural integer multiplication operations, such that a result is an exponentiation.

In an embodiment, next-in-turn used multiplicands are preloaded into a preload register buffer on the fly.

In a further embodiment, apparatus buffers and registers are operative to be loaded with values from external memory sources and said buffers and registers are operative to be unloaded into the external memory source during computations, such that the maximum size of the operands is dependent on available memory means.

In a yet further embodiment there is also provided memory register means, said memory means are typically serial single character in/serial single character out, parallel at least k characters in/parallel at least k characters out, serial single character in/parallel at least k characters out, and parallel k characters in/serial single character out.

Preferably the apparatus is operable to provide, during a final phase of a multiplication type iteration, the multiplier inputs are zero characters which are operative to flush out the left hand segment of the carry save ⊕ accumulator memory.

Preferably, the apparatus is operable to preload next in turn multiplicands into preload memory buffers on the fly, prior to their being required in an iteration.

Preferably, the apparatus is operable to preload multiplicand values into preload buffers on the fly from central storage memory means.

The same device is operable to compute the k character Montgomery constant $J_0$, related to the right hand k character segment of a modulus preferably by resetting both A and B to zero and setting $S_0=1$, whilst subsequently performing a k bit multiplication. The result will reside in the $Y_0$ register.

Modular Multiplication Sequences using Montgomery Type Arithmetic

The k character carry save adder, the CSA, is the basis for the serial/parallel superscalar modular multiplication in both the polynomial field and in the prime number field. Polynomial $GF(2^q)$ based computations are executed preferably with all carry mechanisms switched off.

The Serial—Parallel Super Scalar Montgomery Multiplier computes Montgomery modular product in three phases, wherein in one preferred embodiment, the last phase may be a single clock dump of the whole left hand k character segment with a carry of the CSA (MS for normal multiplications, LS for reverse mode polynomial computations), and in a more compact embodiment, the last phase may be a k effective clock serial flush out of the contents of the CSA.

In previous P2 disclosures, the $Y_0$ factor was computed bit by bit, consequently, only the right hand bit of $J_0$ was consequential, and by definition a one, and a function of the right hand bit of the modulus. In this enhancement device, the device is character serial, and an 1 bit character $Y_0$ is generated at each clock cycle. As in previous P1 disclosures, $Y_0$ is the first phase zero forcing function which adds in the value of modulus a necessary number of times into the accumulated result, so that the relevant answer is congruent and never longer than mk+1 characters, and the first right hand emitted characters were all zeroes. X+QN≡X, as QN≡0 mod N.

Modular Multiplication Sequences

Prior to initiating computation, we assume that there are no previous temporary or random values in the device; that the operands N, B, and at least the first segment value of A are available in the registers of the device. $S_0=0$; the partial product at initiation is typically zero. Typically, modular arithmetic is executed on operands consisting of two or more k character segments, typically in three distinct phases. For a normal full multiplication, where there are m segments of the modulus, there are typically m superscalar multiplication interleaved iterations whence each segment of the multiplicand is multiplied by the total multiplier, typically, B.

The process of the first phase, on the (i=0'th segment) of each interleaved superscalar multiplication is the generic superscalar multiplication accumulation interaction:

$$S_i \oplus A_i \cdot B_0 \oplus Y_0 \cdot N_0$$

($B_0$ and $Y_0$ are serially character by character fed from the first segment of the operand into the multiplier, $A_i$ and $N_0$ are parallel single slice operands, $S_i$ is the partial product from a previous iteration/computation. $S_i=0$ on the 0'th first iteration.)

The first phase process implements a ⊕ summation of the two superscalar products with the right hand segment of the previous result. A k character string of zeroes has emitted from the multiplying device, and is disregarded; a partial first segment result resides in the device buffer, which is summated into the second phase result.

The first phase result consists typically of R, the contents of the CSA concatenated with the serial outputted right hand segment of all zeroes. (In GF(p) computations there is an additional LS carry-in bit to R.)

The process of the second phase is the generic superscalar multiplication accumulation interaction:

$$R \oplus S_i \oplus A_i \cdot \underline{B} \oplus Y_0 \cdot \underline{N}$$

(Remember, an underlined variable, e.g., $\underline{B}$, is the remaining left hand value of an operand. It is typically one or more segments, i.e., m−1 segments. $\underline{B}$ and $\underline{N}$ are serially fed character by character into the multiplier, and both $A_i$, remaining from the first phase, and $Y_0$, which was a multiplier in the first phase and was loaded into the machine in the first phase to be a multiplicand in subsequent iterations, are parallel operands).

At the end of the second phase, typically consisting of m−1 iterations, the left hand segment of $S_i$ remains in the CSA—ready to be transferred—and the right hand slice (k character segment) has emanated from the device, typically into an S register. Note that multiplication in the prime number field has been performed in a conventional carry save summation method. Multiplication in the GF($2^q$) reversed format mode has progressed from most to least significant characters. The $Y_0$ function has anticipated when a modulus value must be "added" into the accumulator. Except for the disabled carry bits in the device, the mechanical process is typically identical for the two number systems.

We disclose the method used for deriving the $Y_{0j}$ characters of the zero-forcing vector in finite fields.

Compute: $J_{0j} \equiv -N_{00}^{-1} \bmod 2^l$.

All natural integers which are relatively prime to a modulus have multiplicative inverses in both number fields. $N_{00}$ is odd and, therefore, has no factor of 2. All factors of mod $2^l$ are 2, so that any number with a least significant 1, and a modulus whose only factor is 2, are relatively prime, and $J_{0j}$ always exists. Formally, for odd $N_{00}$ and $2^l$, gcd($N_{00}$, $2^l$)=1.

This single character of the function can be hardwire implemented with random logic, with simple circuitry, or with a simple look up table. There are only $2^{k-1}$ different values that must be derived in a look up table. In the reverse mode format, the polynomial modulus must be right justified, nominally odd. In typical exponentiational functions, both number fields, the right hand bit of the modulus bit is a one, nominally odd, and the multiplicative inverse of an odd number mod $2^k$ must always be odd.

If l=1, the $J_{00}$ multiplier is explicitly equal to 1, and need not be computed. The result of a character output forced by the $Y_0$ function during the first phase is always 0, consequently the j'th character output, Zij, of the SuperMAP is:

$0 = (2^l R \oplus S_{ij} \oplus A_{i0} \cdot B_{0j} \oplus Y_{0j} \cdot N_{00}) \bmod 2^l = Z_{ij}$; therefore, $(R \oplus S_{ij} \oplus A_{i0} \cdot B_{0j}) \equiv -Y_{0j} \cdot N_{00}$; and $Y_{0j} \equiv -N_{00}^{-1} (R \oplus S_{ij} \oplus A_{i0} \cdot B_{0j}) \bmod r$.

From the above equation, we learn that $J_{00}$ is preferably the negative value of the modular multiplicative inverse of the right hand k character of the modulus for both number systems; noting that in modulo 2 arithmetic, positive and negative values are the same.

R is the summation of the value remaining in the CSA summated to the carry out bit from the final serial adder, 460, in FIG. 2. $S_{ij}$ is the j'th bit of the partial product at the i'th iteration. $A_{i0}$ is the right hand character (LS in GF(p)) of the i'th slice of A. $B_{0j}$ is the j'th character of B. $B_0$ is a constant (multiplier) during all iterations of a Montgomery multiplication. $Y_0$ is a k character vector generated at each (i'th) iteration. $Y_{0j}$ is j'th character generated at the j'th clock of the first phase of an iteration. N, is an m sliced modulus. $N_0$ is the right hand slice of the modulus. $N_{00}$ is the right hand character of $N_0$.

Formalizing the Super scalar modular multiplication method for both fields:

$S_0 = 0$;

For i=0 to m−1 (interleave iterations)
    First phase: (of each interleave)
    R=0
    For j=0 to k−1 (each character of first phase)
        $Y_{0j} = (J_{00} \cdot (R \oplus S_{0j} \oplus A_{i0} \otimes B_{0j})) \bmod 2^l$
        $Z_{ij} = (R \oplus S_{ij} \oplus A_{i0} \otimes B_{0j} \oplus Y_{0j} \otimes N_0) \bmod 2^l$; and
        $R = [(2^l R \oplus S_{ij} \oplus A_{i0} \otimes B_{0j} \oplus Y_{0j} \otimes N_0)] / 2^l$ After k effective clock cycles, the first segment of the Z stream was all zeroes, and was disregarded; the relevant $Y_0$, k character vector, is now prepared to be a multiplicand in the next phase, and the summated R value will be used in the next phase.

Second phase:
    For j=k to n−1
        $Z_{ij} = (R \oplus \underline{S}_{ij} \oplus A_{i0} \otimes \underline{B}_{0j} \oplus Y_{0j} \otimes \underline{N}_{0j}) \bmod 2^l$;
        $R = [2^l R \oplus \underline{S}_{ij} \oplus A_{i0} \cdot \underline{B}_{0j} \oplus Y_{0j} \cdot \underline{N}_{0j}] / 2^l$ Implementation of the above algorithm with a character based serial-parallel multiplier is a simple extension of the above protocol:

(Quotient(x, y) is the integer division function without remainder. For example, if x=$10101_b$, and y=$10000_b$, then Quotient(x,y)=1).

$S_0 = 0$

For i=0 to m−1 (Interleaved loop)
    First phase:
    For j=0 to k−1
        $Y_{0j} =$
        ($J_{00} \cdot S_{i0} \oplus A_{i0} \otimes B_{0j} \oplus \mathcal{Y} \cdot \text{Carry}_0 \oplus \text{Sum}_1 \oplus \text{Quotient}(S_{i0} \oplus \text{Sum}_0, r)$)) mod r
    For t=0 to k−1 (Whole loop with 1 clock pulse)
        $\text{Sum}_t = (\text{Sum}_{t+1} \oplus \mathcal{Y} \cdot \text{Carry}_t \oplus A_{it} \otimes B_{0j} \oplus Y_{0j} \otimes N_{0t}) \bmod r$
        $\text{Carry}_t = (\text{Quotient}((\text{Sum}_{t+1} \oplus \text{Carry}_t \oplus A_{it} \otimes B_{0j} \oplus Y_{0j} \otimes N_{0t}), r)$
    (Output of multiplier device in this stage is '0' s)
    Second phase:
    Main part
    $\text{Carry}_a = 0$
    For j=k to n−1
    For t=0 to k−1 (Whole loop with 1 clock pulse)
        $\text{Sum}_t = (\text{Sum}_{t+1} \oplus \mathcal{Y} \cdot \text{Carry}_t \oplus A_{it} \otimes B_j \oplus Y_{0j} \otimes N_j) \bmod r$
        $\text{Carry}_t = \text{Quotient}((\text{Sum}_{t+1} \oplus \text{Carry}_t \oplus A_{it} \otimes B_j \oplus Y_{0j} \otimes N_j), r)$
        $S_{ij-k} = (S_{i,j-2k} \oplus \mathcal{Y} \cdot \text{Carry}_a) \bmod r$
        $\text{Carry}_a = \text{Quotient}((S_{i,j-2k} \oplus \text{Sum}_0 \oplus \text{Carry}_a), r)$
    Flushing of the multiplier
    For j=n to (n+k−1)
    For t=0 to k−1 (Whole loop with 1 clock pulse)
        $\text{Sum}_t = (\text{Sum}_{t+1} \oplus \mathcal{Y} \cdot \text{Carry}_t) \bmod r$
        $\text{Carry}_t = \text{Quotient}((\text{Sum}_{t+1} \oplus \text{Carry}_t), r)$
        $S_{i,j-k} = (S_{i,j-2k} \oplus \text{Sum}_0 \oplus \mathcal{Y} \cdot \text{Carry}_a) \bmod r$
        $\text{Carry}_a = \text{Quotient}((S_{i,j-2k} \oplus \text{Sum}_0 \oplus \text{Carry}_a), r)$ For a formal explanation with examples of the particular case where l=1 in the GF(p) field, see P1.

The above describes a microelectronic method and apparatus for performing interleaved finite field modular multiplication of integers A and B operative to generate an output stream of A times B modulus N wherein n is the number of characters in the modulus operand register and is larger than k, wherein the $\otimes$ multiplication process is performed in iterations, wherein at each interleaved iteration with operands input into a ⊗ multiplying device, consisting of N, the modulus, B, a multiplier, a previously computed partial result, S, and a k character string segment of A, a multiplicand, the segments progressing from the $A_0$ string segment to the $A_{m-1}$ string segment, wherein each iterative result is ⊕ summated into a next in turn S, temporary result, in turn, wherein first emitting characters of iterative results are zeroes, the apparatus comprising:

Typically, there may be four serial l bit character registers feeding the multiplying device, first (B), second (S) and third (N) and preferably (A), configured to efficiently load the multiplier. For computations on long operands which typically are not accommodated in the MAP's internal registers, the CPU can load operands from its accessible memory.

Typically, these main memory registers store and output operands, respectively operative to store a multiplier value, a partial result value and a modulus, N.

The modular multiplying device operative to ⊕summate into the ⊕accumulation device, in turn one or two of a plurality of multiplicand values, in turn, during the phases of the iterative ⊗ multiplication process, and in turn to receive as multipliers, in turn, inputs from a first value B register, second, from an "on the fly" anticipating value, $Y_0$, as a multiplier to force first emitting right-hand zero output characters in each iteration, and third values from the modulus, N, register.

The multiplicand parallel registers are operative to receive in turn, values from the A, B, and N register sources, and in turn, also a multiplicand zero forcing $Y_0$, value.

The zero forcing $Y_0$ detect device is operative to generate a binary string operative to be a multiplier during the first phase of operation and is operative to be a multiplicand in the second phase of each iterative multiplication.

The multiplicand values to be switched into the ⊕ accumulation device for the first phase consist can be on of four values, a first zero value, a second value, $A_i$, which is a k character string segment of a multiplicand, A, and a third value $N_0$, being the first emitting k characters of the modulus, N. The $N_0$ value is typically switched in at the start of a multiplication, if there is a fourth preload buffer as in FIG. 6. Then when a k character slice of A is input, the $A_i$ value is serially summated with the $N_0$ value and stored in the fourth buffer.

If a computation is typically on a single k character modulus, then there is no need for the S register, or for the temporary result value, S. If the operand is 2k characters or longer, then the manipulations must be iterative, with progressing $A_i$ slices. For squaring operations slices of B are typically snared from the B stream on the fly and preloaded into the $A_i$ preload buffer.

At the first iteration of a multiplication procedure, the temporary result is zero.

Subsequent temporary results from previous iterations, are operative to be ⊕ summated with the value emanating from the ⊕ accumulation device, to generate a partial result for the next in turn iteration;

The multiplicand values to be input, in turn, into the ⊕ accumulation device for the second phase being, a first zero value, which is a pseudo register value, a second $A_i$ operand, remaining in place from the first phase, and a third $Y_0$ value having been anticipated in the first phase operative to continue multiplying the remaining characters of the N modulus.

The multiplier values input into the multiplying device in the first phase being a first emitting string, $B_0$, being the first emitting string segment of the B operand, concurrently ⊗ multiplying with the second ⊗ multiplier value consisting of the anticipated $Y_0$ string which is simultaneously loaded character by character as it is generated into a preload multiplicand buffer for the second phase;

The two multiplier values input into the apparatus during the second phase being the left hand n–k character values from the B operand, designated B̲, and the left hand n–k characters of the N modulus, designated N̲, respectively.

The third phase is a flush out of the device operative to transfer the left hand segment of a result value remaining in the ⊕ accumulation device. This can either be a single clock data dump, or a simple serial unload, driven by zero characters fed in the multiplier inputs.

If the dump is a parallel dump, some means for comparing to decide if the result demands an additional reduction by the modulus.

One of the more innovative enhancements in the invention, is the reverse mode multiplication in the $GF(2^q)$. Because of the lack of interaction between adder cells in this arithmetic, it is possible to perform multiplication and reduction starting from the MS end of the product, thereby having a product that is the modular reduced answer, without a burdensome parasite, caused by disregarded zeroes which, are tantamount to performing a right shift in conventional Montgomery multiplication.

The second innovation that allows for automatic zero forcing is an extension of the $Y_0$ function of patent application P2, which describes a device wherein only one bit was anticipated at a time. There the $J_{00}$ bit, only, multiplied the single bit XORed values. Both the multiplicative inverse of an odd number and its negative value produce an odd number. This saved implementing a look up table or a random logic circuit to compute the $J_0$ value for l=1. Note, $J_0$ is a different quantity in non-alike number systems. We have shown in this extension how a $Y_0$ value can be derived, for both relevant number fields.

The following describes the elements of the circuitry operative to anticipate the $Y_0$ value using first emitting values of the multiplicand, and present inputs of the B multiplier, carry out values from the ⊕ accumulation device, ⊕ summation values from the ⊕ accumulation device, the present values from the previously computed partial result, and carry out values from the ⊕ adder which ⊕ summates the result from the ⊕ accumulation device with the previous partial result.

Stated differently, the six values operative to control the zero forcing function, are:

i. the l bit $S_{out}$ bits of the result of the l bit by l bit mod $2^l$ ⊗ multiplication of the right-hand character of the $A_i$ register times the $B_d$ character of the B Stream, $A_0$ ⊗ $B_d$ mod $2^l$;

ii. the first emitting carry out character from the ⊕ accumulation device, $\mathscr{S}(CO_0)$;

iii. the l bit $S_{out}$ character from the second from the right-hand character emitting cell of the ⊕ accumulation device, $SO_1$;

iv. the next in turn character value from the S stream, $S_d$;

v. the l bit carry out character from the Z output full adder, $\mathscr{S}(CO_z)$;

vi. the l bit $J_0$ value, which is the negative multiplicative inverse of the right-hand character in the $N_0$ modulus multiplicand register;

wherein values, $A_0$ ⊗ $B_d$ mod $2^l$, $\mathscr{S}(CO_0)$, $SO_1$, $S_d$ are ⊕ added character to character together and "on the fly" ⊗ multiplied by the $J_0$ character to output a valid $Y_0$ zero-forcing anticipatory character to force an l bit egressing character string of zeroes. Just as in P1, in order to determine if an output must be modular reduced, a sensor operative to compare the output result to N, the modulus, the mechanism operative to actuate a second subtractor on the output of the result register, thereby to output a modular reduced value which is limited congruent to the output result value precluding the necessity to allot a second memory storage for a smaller result.

The single $\oplus$ accumulation device, configured to perform multiplication, and an anticipating zero forcing mechanism together are operative to perform a series of interleaved $\otimes$ modular multiplications and squarings. The total device performs the equivalent of three integer multiplications, as in a conventional Montgomery method, $J_0$ is a k character device multiplying the first k character summation of $B_0$ $\otimes A_i$ and $S_i$, and in finally using the $Y_0$ to multiply N.

Whilst the SuperMAP is computing the last iteration of a multiplication, the first slice of a next multiplication can be preloaded into a preload register buffer means on the fly. This value may be the result of a previous multiplication or a slice of a multiplicand residing in one of the register segments in the register bank of FIG. 1 or FIG. 5.

The preloaded value which is a $\oplus$ summation of two multiplicands is $\oplus$ summated into a k character register, only, for $GF(2^q)$ computations. In GF(p) computations, provision must be made for an additional carry bit.

Especially for very long moduli, buffers and registers adjacent to the SuperMAP typically have insufficient memory resources. Means for loading operands directly into preload buffers is provided, operative to store operands in the CPU's memory map. For reverse format multiplication, bit order of input words from the CPU are typically reversed in the Data In and Data Out devices.

BRIEF DESCRIPTION OF THE DRAWINGS

In the drawings:

Thick lines designate k character (kl bit) wide parallel bus lines. Thinner contiguous signal lines depict l bit wide lines. Most control lines are not depicted; those that are included are typically necessary to understand procedures and are typically drawn as dash-dot-dash lines

FIG. 6 is a simplified block diagram of an operational unit, wherein the $Y_0$ sense is a device operative to force a zero first phase output;

FIGS. 8A and 8B, taken together describe generation of the $Y_0$ vector in $GF(2^q)$ and in GF(p). FIG. 8A is a set of look up tables for determining the negative multiplicative inverse of the right hand character of $N_0$, for l=2 and l=4 and FIG. 8B describes, in simplified block form the signals that generate the $Y_0$ function for l=2 and l=4 in both number fields.

DESCRIPTION OF PREFERRED EMBODIMENTS

Figure 1:
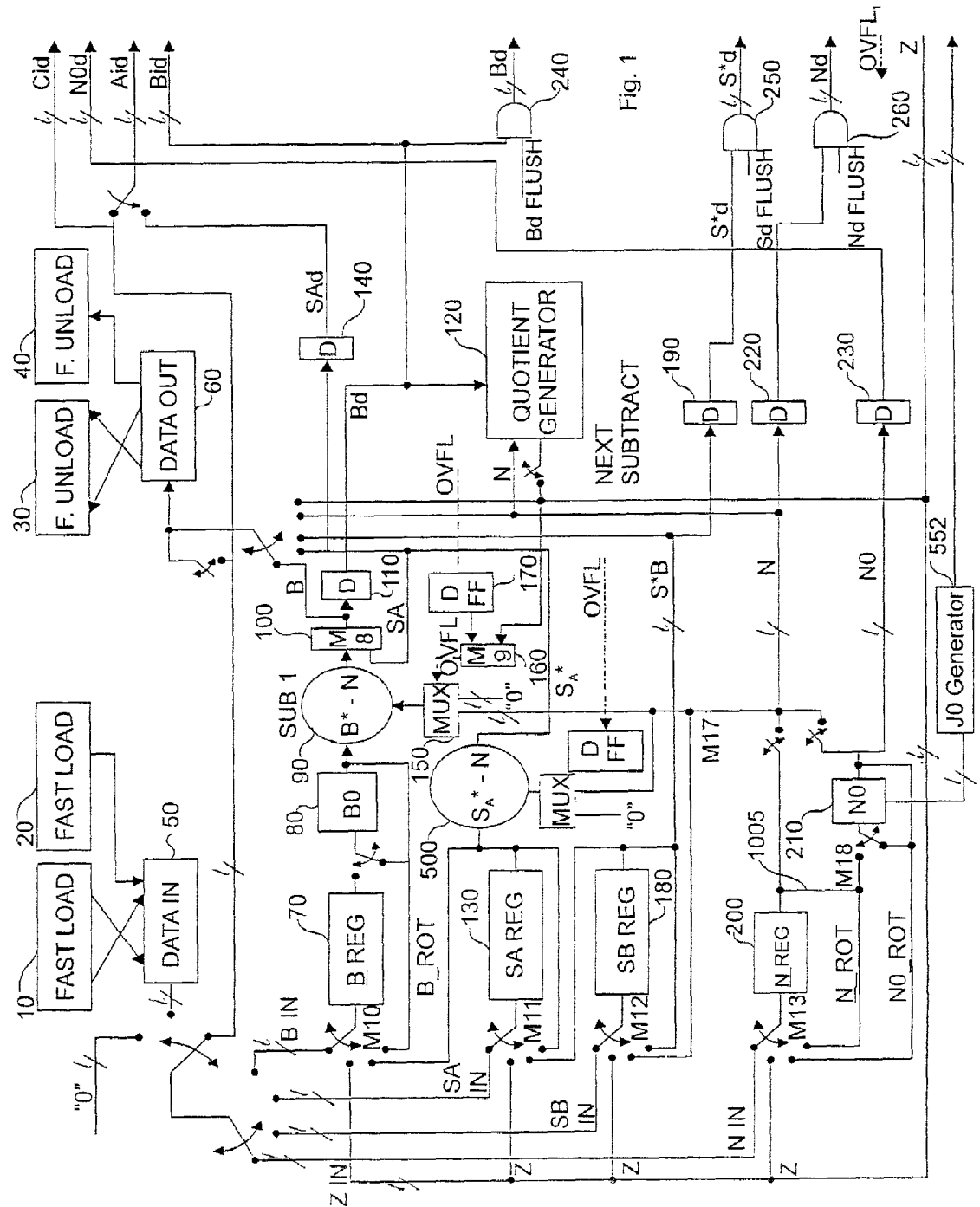
FIG. 1 is a block diagram of the apparatus according to an embodiment of the invention where four main registers are depicted and the serial data flow path to the operational unit is shown and the input and output data path to the host CPU of FIG. 3.

In the drawings:

Thick lines designate k character (kl bit) wide parallel bus lines. Thinner contiguous connecting signal lines depict l bit wide lines. Typically, control lines are not depicted; those that are preferably necessary to understand procedures, are typically drawn as dash-dot-dash lines FIGS. 1–2, taken together, form a simplified block diagram of a serial-parallel arithmetic logic unit (ALU) constructed and operative in accordance with a preferred embodiment of the present invention. The apparatus of FIGS. 1–2, preferably include the following components:

Single Multiplexers—Controlled Switching Elements which select one signal or character stream from a multiplicity of inputs of signals and direct it this chosen signal to a single output. Multiplexers are marked M1 to M13, and are intrinsic parts of larger elements.

The Multiplexer and pre-adder, 390, is an array of k l+1 multiplexers, and chooses which of the four k or k+1 character inputs are to be added into the CSA, 410.

The B (70) and 80), $S_A$ (130), $S_B$ (180), and N (200) and (210) are the four main serial main registers in a preferred embodiment. The $S_A$ is conceptually and practically redundant, but can considerably accelerate very long number computations, and save volatile memory resources, especially in the case where the length of the modulus is 2·k·m characters long.

Serial Adders and Serial Subtractors are logic elements that have two serial character inputs and one serial character output, and summate or perform subtraction on two long strings of characters. Components 90 and 500 are subtractors, 330, and 460 are serial adders. The propagation time from input to output is very small. Serial subtractors 90 and 500 typically reduce B* to B if B* is larger than or equal to N and/or S* to S if S* is larger than or equal to N. Serial Subtractor 480, is used, as part of a comparator component to detect if B* will be larger than or equal to N. Full Adder 330, adds the two character streams which feed the Load Buffer 340, with a value that is equal to the sum of the values in the 290 and 320 Load Buffers.

Fast Loaders and Unloaders, 10 and 20, and 30 and 40, respectively, are devices to accelerate the data flow from the CPU controller. Typically, these devices eliminate the necessity for other direct memory access components. 20 and 40 are for reversing the data word, as is necessary for reversing the data words for reverse format $GF(2^q)$ multiplications.

Data In, 50, is a parallel in serial out device, as the present ALU device is a serial fed systolic processor, and data is fed in, in parallel, and processed in serial.

Data Out, 60, is a serial in parallel out device, for outputting results from the coprocessor. The quotient generator is that part of FIG. 2, which generates a quotient character at each iteration of the dividing mechanism.

Flush Signals on Bd, 240; on S*d, 250; and on Nd, 260, are made to assure that the last k+1 characters can flush out the CSA. A second embodiment would reconcile the R data at the end of the second phase, and would perform a single parallel data dump to flush out the CSA.

Load Buffers R1, 290; R2, 320; and R3, 340 are serial in parallel out shift registers adapted to receive the three possible more than zero multiplicand combinations.

Latches L1, 360; L2, 370; and L3, 380; are made to receive the outputs from the load buffers, thereby allowing the load buffers, the temporal enablement to process the next phase of data before this data is preferably latched into L1, L2, and L3. Latch L0 is typically a "virtual" constant all zero input into 390, which typically is not implemented in latched logic.

$Y_0$ Sense, 430, is the logic device, which determines the number of times the modulus is accumulated, in order that a k character string of LS zeros will exit at Z in Ⓧ multiplications.

One character delay devices 100, 220 and 230 are inserted in the respective data streams to accommodate for computation synchronization between the data preparation devices in FIG. 1, and the data processing devices in FIG. 1.

The k character delay shift register 470, synchronizes N and the subtractor subtracts N from the result after disregarding the right hand output zero character string for the larger than N comparison.

The Carry Save Accumulator is almost identical to a serial/parallel multiplier, excepting for the fact that three different larger than zero values can be summated, instead of the single value as conventionally is latched onto the input of the s/p multiplier. When used in polynomial based computations "all carry dependent" functions are disabled.

The Insert Last Carry, 440, is used to insert the (m·k·l+1)'th bit of the S stream, as the S register is only m·k characters long.

The borrow/overflow detect, 490, typically detects if a result is larger than or equal to the modulus (from N), or in GF(p) computations. In polynomial based computations the overflow is detected if the first significant result bit is a one.

The control mechanism is not depicted, but is preferably understood to be a set of cascaded counting devices with finite state machines for specific functions with switches set for systolic data flow in both GF(p) and GF($2^q$).

For modular multiplication in the prime and composite prime field of numbers, we define A and B to be the multiplicand and the multiplier, and N to be the modulus which is typically larger than A or B. N also denotes the register where the value of the modulus is stored. N, may, in some instances, be smaller than A. We define A, B, and N as m·k=n character long operands. Each k character group will be called a segment, the size of the group defined by the size of the multiplying device. Then A, B, and N are each m characters long. For ease in following the step by step procedural explanations, assume that A, B, and N are 512 bits long, (n=512); assume that k is 64 characters long because of the present cost effective length of such a multiplier, and data manipulation speeds of simple CPUs; and m=8 is the number of segments in an operand and also the number of iterations in a squaring or multiplying loop with a 512 bit operand. All operands are positive integers. More generally, A, B, N, n, k and m may assume any suitable values.

In non-modular functions, the N and S registers can be used for temporary storage of other arithmetic operands.

We use the symbol, ≡, to denote congruence of modular numbers, for example 16≡2 mod 7, and we say 16 is congruent to 2 modulo 7 as 2 is the remainder when 16 is divided by 7. When we write Y mod N≡X mod N; both Y and X may be larger than N; however, for positive X and Y, the remainders will be identical. Note also that the congruence of a negative integer Y, is Y+u·N, where N is the modulus, and if the congruence of Y is to be less than N, u will be the smallest integer which will give a positive result.

We use the symbol, ¥, to denote congruence in a more limited sense. During the processes described herein, a value is often either the desired value, or equal to the desired value plus the modulus. For example X¥2 mod 7·X can be equal to 2 or 9. We say X has limited congruence to 2 mod 7. In the polynomial based field, the analog is a monic value, which we say is larger than N, and is reduced by XORing to the modulus. As in GF($2^q$), there is no overflow, this Yen value is typically disregarded.

When we write X=A mod N, we define X as the remainder of A divided by N; e.g., 3=45 mod 7.

In number theory the modular multiplicative inverse is a basic concept. For example, the modular multiplicative inverse of X is written as $X^{-1}$, which is defined by X·X mod N=1. If X=3, and N=13, then $X^{-1}$=9, i.e., the remainder of 3·9 divided by 13 is 1.

The acronyms MS and LS are used to signify most significant and least significant when referencing bits, characters, segments, and full operand values, as is conventional in digital nomenclature.

Throughout this specification N designates both the value N, and the name of the shift register which contains N. An asterisk superscript on a value, denotes that the value, as stands, is potentially incomplete or subject to change. A is the value of the number which is to be exponentiated, and n is the character length of the N operand. After initialization when A is "Montgomery normalized" to A* (A*=$2^n$·A—to be explained later) A* and N are constant values throughout the intermediate step in the exponentiation. During the first iteration, after initialization of an exponentiation, B is equal to A*. B is also the name of the register wherein the accumulated value, which finally equals the desired result of exponentiation resides. S* designates a temporary value, and S, $S_A$ and $S_B$ designate, also, the register or registers in which all but the single MS bit of S is stored. (S* concatenated with this MS bit is identical to S.) S(i–1) denotes the value of S at the outset of the i'th iteration; $S_0$ denotes the LS segment of an S(i)'th value.

We refer to the process in the GF(p) field (defined later) 𝒫(A·B)N as multiplication in the P field, or sometimes, simply, a multiplication operation.

As we have used the standard structure of a serial/parallel multiplier as the basis for constructing a double acting serial parallel multiplier, we differentiate between the summating part of the multiplier, which is based on carry save accumulation, (as opposed to a carry look ahead adder, or a ripple adder, the first of which is considerably more complicated and the second very slow), and call it a carry save adder or accumulator, and deal separately with the preloading mechanism and the multiplexer and latches, which allow us to simultaneously multiply A times B and C times D, while continuously summate both results with a previous result, S, e.g., A·B+C·D+S, converting this accumulator into a more versatile engine. Additional logic is added to this multiplier in order to provide for an anticipated sense operation necessary for modular reduction and serial summation necessary to provide for modular arithmetic and ordinary integer arithmetic on very large numbers.

Montgomery Modular Multiplication in GF(p)

The following description refers to Montgomery arithmetic in the GF(p) of numbers. The present device may be used for Montgomery arithmetic on polynomial based numbers in GF($2^q$), but would be degraded in performance, as computations would be in the P field, where all executable operands are multiplied by a factor of $2^n$.

In a classic approach for computing a modular multiplication, A·B mod N, the remainder of the product A·B is computed by a division process. Implementing a conventional division of large operands is more difficult to perform than serial/parallel multiplications.

Using Montgomery's modular reduction method, division is essentially replaced by multiplications using two precomputed constants. In the procedure demonstrated herein, there is only one precomputed constant, which is a function of the modulus. This constant is, or can be, computed using this ALU device.

A simplified presentation of the Montgomery process, as is used in this device is now provided, followed by a complete preferred description.

If we have an odd number (an LS bit one), e.g., 1010001 (=$81_{10}$) we can always transform this odd number to an even number (a single LS bit of zero) by adding to it another fixing, compensating odd number, e.g., 1111 (=$15_{10}$); as 1111+1010001=1100000 ($96_{10}$). In this particular case, we have found a number that produced five LS zeros, because we knew in advance the whole string, 81, and could easily determine a binary number which we could add to 81, and would produce a new binary number that would have as many LS zeros as we might need. This fixing number must have a right hand one, else it has no effect on the progressive LS characters of a result.

If our process is a clocked serial/parallel carry save process, where it is desired to have a continuous number of LS zeros, and wherein at each clock cycle we only have to fix the next bit, at each clock it is sufficient to add the fix, if the next bit were to be a one or not to add the fix if the anticipated bit were to be a zero. However, in order not to cause interbit overflows (double carries), this fix is preferably summated previously with the multiplicand, to be added into the accumulator when the relevant multiplier bit is one, and the Y Sense also anticipates a one.

Now, as in modular arithmetic, we only are interested in the remainder of a value divided by the modulus, we know that we can add the modulus any number of times to a value, and still have a value that would have the same remainder. This means that we can add Y·N=$\Sigma y_i \cdot r^i \cdot$N to any integer, and still have the same remainder; Y being the number of times we add in the modulus, N, to produce the required kl right hand zeros. As described, the modulus that we add can only be odd. (Methods exist wherein even moduli are defined as $r^i$ times the odd number that results when i is the number of LS zeros in the even number.)

Montgomery interleaved reductions typically reduce storage requirements, and the cost effective size of the multiplication devices. This is especially useful when performing public key cryptographic functions where we multiply one large integer, e.g., n=1024 bit, by another same length large integer; a process that would ordinarily produce a double length integer.

We can add in Ns (the modulus) enough times to A·B=X or A·B+S=X during the process of multiplication (or squaring) so that we will have a number, Z, that has n LS zeros, and, at most, n+1 MS characters.

We can continue using such numbers, disregarding the LS n characters, if we remember that by disregarding these zeros, we have divided the desired result by $r^n$.

When the LS n characters are disregarded, and we only use the most significant n (or n+1) characters, then we have effectively multiplied the result by $r^{-n}$, the modular inverse of $r^n$. If we would subsequently re-multiply this result by $r^n$ mod N (or $r^n$) we would obtain a value congruent to the desired result (having the same remainder) as A·B+S mod N. As is seen, using MM, the result is preferably multiplied by $r^{2n}$ to overcome the $r^{-n}$ parasitic factor reintroduced by the MM.

EXAMPLE

A·B+S mod N=(12·11+10) mod 13=(1100·1011+1010)$_2$ mod $1011_2$. l=1, r=2

We will add in $2^i$ N whenever a fix is necessary on one of the n LS bits.

| | B | 1001 |
|---|---|---|
| ×A | | 1100 |
| add S | | 1010 |
| add $A(0)·B$ | | 0000 |
| | ------ | sum of LS bit = 0 not add N |
| add $2^0(N·O)$ | | 0000 |
| sum and shift | | 0101 → 0 LS bit leaves carry save adder |
| add $A(1)·B$ | | 0000 |
| | ------ | sum of LS bit = 0 – add N |
| add $2^1(N·1)$ | | 1101 |
| sum and shift | | 1001 → 0 LS bit leaves CS adder |
| add $A(2)·B$ | | 1011 |
| | ------ | sum LS bit = 0 don't add N |
| add $2^2(N·O)$ | | 0000 |
| sum and shift | | 1010 → 0 LS bit leaves CS adder |
| add $A(3)·B$ | | 1011 |
| | ------ | sum LS bit = 1 add N |
| add $2^3(N·O)$ | | 1101 |
| sum and shift | | 10001 → 0 LS bit leaves CS adder |

And the result is 10001 $0000_2$ mod 13=17·$2^4$ mod 13.

As 17 is larger than 13 we subtract 13, and the result is: 17·$2^4$≡4·$2^4$ mod 13. formally $2^{-n}$(A·B+S) mod N=9 (12·11+10) mod 13≡4

In Montgomery arithmetic we utilize only the MS non-zero result, 4, and effectively remember that the real result has been divided by $2^n$; n zeros having been forced onto the MM result.

We have added in $(8+2) \cdot 13 = 10 \cdot 13$ which effectively multiplied the result by $2^4 \bmod 13 \equiv 3$. In effect, had we used the superfluous zeros, we can say that we have performed, $A \cdot B + Y \cdot N + S - (12 \cdot 11 + 10 \cdot 13 + 10)$ in one process, which will be described possible on a preferred embodiment.

Check—$(12 \cdot 11 + 10) \bmod 13 = 12$; $4 \cdot 3 = 12$.

In summary, the result of a Montgomery Multiplication is the desired result multiplied by $2^{-n}$.

To retrieve the previous result back into a desired result using the same multiplication method, we would have to Montgomery Multiply the previous result by $2^{2n}$, which we will call H, as each MM leaves us with a parasitic factor of $2^{-n}$.

The Montgomery Multiply function $\mathcal{P}(A \cdot B)N$ performs a multiplication modulo N of the A·B product into the P field. (in the above example, where we derived 4). The retrieval from the P field back into the normal modular field is performed by enacting P on the result of $\mathcal{P}(A \cdot B)N$ using the precomputed constant H. Now, if $P \equiv \mathcal{P}(A \cdot B)N$, it follows that $\mathcal{P}(P \cdot H) \equiv A \cdot B \bmod N$; thereby performing a normal modular multiplication in two P field multiplications.

Montgomery modular reduction averts a series of multiplication and division operations on operands that are n and 2n characters long, by performing a series of multiplications, additions, and subtractions on operands that are n or n+1 characters long. The entire process yields a result which is smaller than or equal to N. For given A, B and odd N there is always a Q, such that $A \cdot B + Q \cdot N$ will result in a number whose n LS characters are zero, or:

$$P \cdot 2^n = A \cdot B + Q \cdot N$$

This means that we have an expression that is 2n characters long (with a possible one bit overflow), whose n LS characters are zero.

Now, for radix $r = 2^l$; let $I \cdot r^n \equiv 1 \bmod N$ (I exists for all odd N). Multiplying both sides of the previous equation by I yields the following congruences: from the left side of the equation:

$P \cdot I \cdot r^n \equiv P \bmod N$; (Remember that $I \cdot r^n \equiv 1 \bmod N$)

and from the right side:

$A \cdot B \cdot I + Q \cdot N \cdot I \equiv A \cdot B \cdot I \bmod N$; (Remember that $Q \cdot N \cdot I \equiv 0 \bmod N$)

therefore:

$P \equiv A \cdot B \cdot I \bmod N$.

This also means that a parasitic factor $I = r^{-n} \bmod N$ is introduced each time a P field multiplication is performed.

We define the P operator such that:

$P \equiv A \cdot B \cdot I \bmod N \equiv \mathcal{P}(A \cdot B)N$.

and we call this "multiplication of A times B in the $\mathcal{P}$ field", or Montgomery Multiplication.

The retrieval from the P field can be computed by operating $\mathcal{P}$ on P·H, making:

$\mathcal{P}(P \cdot H) \equiv A \cdot B \bmod N$;

We can derive the value of H by substituting P in the previous congruence.

We find:

$\mathcal{P}(P \cdot H) \equiv (A \cdot B \cdot I)(H)(I) \bmod N$;

(see that $A \cdot B \cdot I \leftarrow P$; $H \leftarrow H; I \leftarrow$ and any multiplication operation introduces a parasitic I)

If H is congruent to the multiple inverse of $I^2$ then the congruence is valid, therefore:

$H = I^{-2} \bmod N \equiv r^{2n} \bmod N$ (H is a function of N and we call it the H parameter)

In conventional Montgomery methods, to enact the P operator on A·B, the following process may be employed, using the precomputed constant J:

1) $X = A \cdot B$
2) $Y = (X \cdot J) \bmod r^n$ (only the n LS characters are necessary)
3) $Z = X + Y \cdot N$
4) $S = Z/r^n$ (The requirement on J is that it forces Z to be divisible by $r^n$)
5) P¥S mod N (N is to be subtracted from S, if $S \geq N$)

Finally, at step 5):

P¥$\mathcal{P}(A \cdot B)N$,

[After the subtraction of N, if necessary:

$P = \mathcal{P}(A \cdot B)N$]

Following the above:

$Y = A \cdot B \cdot J \bmod r^n$ (using only the n LS characters);

and:

$Z = A \cdot B + (A \cdot B \cdot J \bmod r^n) \cdot N$.

In order that Z be divisible by $r^n$ (the n LS characters of Z are preferably zero) and the following congruence will exist:

$[A \cdot B + (A \cdot B \cdot J \bmod r^n) \cdot N] \bmod r^n \equiv 0$

In order that this congruence will exist, $N \cdot J \bmod r^n$ is congruent to −1 or:

$J \equiv -N^{-1} \bmod r^n$.

and we have found the constant J.

J, therefore, is a precomputed constant which is a function of N only. However, in a machine that outputs a MM result, character by character, provision should be made to add in Ns at each instance where the output character in the LS string would otherwise have been a zero, thereby obviating the necessity of precomputing J and subsequently computing $Y = A \cdot B \cdot J \bmod r^n$, as Y can be detected character by character using hardwired logic. We have also described that this method can only work for odd Ns.

Therefore, as is apparent, the process described employs three multiplications, one summation, and a maximum of one subtraction, for the given A, B, N, and a precomputed constant to obtain $\mathcal{P}(A \cdot B)N$. Using this result, the same process and a precomputed constant, H, (a function of the module N) we are able to find A·B mod N. As A can also be equal to B, this basic operator can be used as a device to square or multiply in the modular arithmetic.

Interleaved Montgomery Modular Multiplication

The previous section describes a method for modular multiplication which involved multiplications of operands which were all n characters long, and results which required 2n+1 characters of storage space.

Using Montgomery's interleaved reduction as described in P1, it is possible to perform the multiplication operations with shorter operands, registers, and hardware multipliers; enabling the implementation of an electronic device with relatively few logic gates.

First we will describe how the device can work, if at each iteration of the interleave, we compute the number of times that N is added, using the $J_0$ constant. Later, we describe how to interleave, using a hardwire derivation of $Y_0$, which will eliminate the $J_{0+}$ phase of each multiplication {(2) in the following example}, and enable us to integrate the functions of two separate serial/multipliers into the new single generic multiplier which can perform $A \cdot B + C \cdot N + S$ at better than double speed using similar silicon resources.

Using a k character multiplier, it is convenient to define segments of k character length; there are m segments in n characters; i.e., $m \cdot k = n$. $J_0$ will be the LS segment of J.

Therefore:

$$J_0 \equiv -N_0^{-1} \bmod r^k \ (J_0 \text{ exists as } N \text{ is odd}).$$

Note, the J and $J_0$ constants are compensating numbers that when enacted on the unreduced output, tell us how many times to add the modulus, in order to have a predefined number of least significant zeros. We will later describe an additional advantage to the present serial device; since, as the next serial bit of output can be easily determined, we can always add the modulus (always odd) to the next intermediate result. This is the case if, without this addition, the output character, the LS serial bit exiting the CSA, would have been a "1"; thereby adding in the modulus to the previous even intermediate result, and thereby promising another LS zero in the output string. Remember, congruency is maintained, as no matter how many times the modulus is added to the result, the remainder is constant.

In the conventional use of Montgomery's interleaved reduction, $\mathcal{P}(A \cdot B)N$ is enacted in m iterations as described in steps (1) to (5):

Initially $S(0)=0$ (the ¥ value of S at the outset of the first iteration).

For $i=1,2\ m$:

1) $X = S(i-1) + A_{i-1} \cdot B$ ($A_{i-1}$ is the i−1 'th character of A; $S(i-1)$ is the value of S at the outset of the i'th iteration.)

2) $Y_0 = X_0 \cdot J_0 \bmod r^k$ (The LS k characters of the product of $X_0 \cdot J_0$)

(The process uses and computes the k LS characters only, e.g., the least significant 64 characters) In the preferred implementation, this step is obviated, because in a serial machine $Y_0$ can be anticipated character by character.

3) $Z = X + Y_0 \cdot N$

4) $S(i) = Z/r^k$ (The k LS characters of Z are always 0, therefore Z is always divisible by $r^k$. This division is tantamount to a k character right shift as the LS k characters of Z are all zeros; or as will be seen in the circuit, the LS k characters of Z are simply disregarded.

5) $S(i) = S(i) \bmod N$ (N is to be subtracted from those $S(i)$'s which are larger than N ). Finally, at the last iteration (after the subtraction of N, when necessary), $C = S(m) = \mathcal{P}(A \cdot B)N$.

To derive $F = A \cdot B \bmod N$, the P field computation, $\mathcal{P}(C \cdot H)N$, is performed.

It is desired to know, in a preferred embodiment, that for all $S(i)$'s, $S(i)$ is smaller than 2N. This also means, that the last result ($S(m)$) can always be reduced to a quantity less than N with, at most, one subtraction of N.

We observe that for operands which are used in the process:

$S(i-1) < r^{n+1}$ (the temporary register can be one bit longer than the B or N register),
$B < N < r^n$ and $A_{i-1} < r^k$.

By definition:
$S(i) = Z/r^k$ (The value of S at the end of the process, before a possible subtraction)

For all Z, $Z(i) < r^{n+k+1}$.
$X_{max} = S_{max} + A_i \cdot B < r^{n+1} - 1 + (r^k - 1)(r^n - 1)$
$Q_{max} = Y_0 N < (r^k - 1)(r^n - 1)$ therefore:
$Z_{max} < r^{k+n+1} - r^{k+1} < r^{k+n+1} - 1$.

and as $Z_{max}$ is divided by $r^k$:
$S(m) < r^{n+1} - r^1$.

Because $N_{min} > r^n - r$, $S(m)_{max}$ is always less than $2 \cdot N_{min}$, and therefore, one subtraction is all that is necessary on a final result.

$S(m)_{max} - N_{min} = (r^{n+1} - r^1 - 1) - (r^n - 1) = r^n - 4 < N_{min}$.

Example of a Montgomery interleaved modular multiplication:

The following computations in the hexadecimal format clarify the meaning of the interleaved method:

N=a59, (the modulo), A=99b, (the multiplier), B=5c3 (the multiplicand), n=12, r=2, (the character length of N), k=4, (the size in characters of the multiplier and also the size of a segment), and m=3, as $n = k \cdot m$.

$J_0 = 7$ as $7 \cdot 9 \equiv 1 \bmod 16$ and $H \equiv 2^{2 \cdot 12} \bmod a59 \equiv 44b$.

The expected result is $F \equiv A \cdot B \bmod N \equiv 99b \cdot 5c3 \bmod a59 \equiv 375811 \bmod a59 \equiv 220_{16}$.

Initially: $S(0) = 0$

Step 1 $X = S(0) + A_0 \cdot B = 0 + b \cdot 5c3 = 3f61$
$Y_0 = X_0 \cdot J_0 \bmod r^k = 7$ ($Y_0$—hardwire anticipated in SuperMAP)
$Z = X + Y_0 \cdot N = 3f61 + 7 \cdot a59 = 87d0$
$S(1) = Z/r^k = 87d$ Step 2 $X = S(1) + A_1 \cdot B = 87d + 9 \cdot 5c3 = 3c58$
$Y_0 = X_0 \cdot J_0 \bmod r^k = 8 \cdot 7 \bmod 2^4 = 8$ (Hardwire anticipated)
$Z = X + Y_0 \cdot N = 3c58 + 52c8 = 8f20$
$S(2) = Z/r^k = 8f2$ Step 3 $X = S(2) + A_2 \cdot B = 8f2 + 9 \cdot 5c3 = 3ccd$
$Y_0 = d \cdot 7 \bmod 2^4 = b$ (Hardware anticipated)
$Z = X + Y_0 \cdot N = 3ccd + b \cdot a59 = aea0$
$S(3) = Z/r^k = aea$, as $S(3) > N$,
$S(m) = S(3) - N = aea - a59 = 91$ Therefore $C = \mathcal{P}(A \cdot B)N = 91_{16}$.

Retrieval from the P field is performed by computing $\mathcal{P}(C \cdot H)N$:

Again initially: $S(0) = 0$
Step 1 $X = S(0) + C_0 \cdot H = 0 + 1 \cdot 44b = 44b$
$Y_0 = d$ (Hardwire anticipated in SuperMAP)
$Z = X + Y_0 \cdot N = 44b + 8685 = 8ad0$
$S(1) = Z/r^k = 8ad$ Step 2 $X = S(1) + C_1 \cdot H = 8ad + 9 \cdot 44b = 2f50$
$Y_0 = 0$ (Hardwire anticipated in SuperMAP)
$Z = X + Y_0 \cdot N = 2f50 + 0 = 2f50$
$S(2) = Z/r^k = 2f5$ Step 3 $X = S(2) + C_2 \cdot H = 2f5 + 0 \cdot 44b = 2f5$
$Y_0 = 3$ (Hardwire anticipated in SuperMAP)
$Z = X + Y_0 \cdot N = 2f5 + 3 \cdot a59 = 2200$
$S(3) = Z/r^k = 220_{16}$ which is the expected value of 99b·5c3 mod a59.

If at each step we disregard k LS zeros, we are in essence multiplying the n MS characters by $r^k$. Likewise, at each step, the i'th segment of the multiplier is also a number multiplied by $r^{ik}$, giving it the same rank as S(i).

It can also be noted that in another preferred embodiment, wherein it is of some potential value to know the $J_0$ constant, if $A_i \cdot B + S = 1$; then $Y_0 = -N_0^{-1} = J_0$ Exponentiation:

The following derivation of a sequence [D. Knuth, *The art of computer programming*, vol. 2: Seminumerical algorithms, Addison-Wesley, Reading Mass., 1981] hereinafter referred to as "Knuth", explains a sequence of squares and multiplies, which implements a modular exponentiation.

After precomputing the Montgomery constant, $H=2^{2n}$, as this device can both square and multiply in the P field, we compute:

$$C = A^E \bmod N.$$

Let E(j) denote the j bit in the binary representation of the exponent E, starting with the MS bit whose index is 1 and concluding with the LS bit whose index is q, we can exponentiate as follows for odd exponents:

A*¥$\mathcal{P}$(A·H)N A* is now equal to A·$2^n$.
B=A*
FOR j=2 TO q−1
  B¥$\mathcal{P}$(B·B)N
  IF E(j)=1 THEN
  B¥$\mathcal{P}$(B·A*)N
ENDFOR
B¥$\mathcal{P}$(B·A)N E0)=1; B is the last desired temporary result multiplied by $2^n$,
  A is the original A.
C=B
C=C−N if C≧N.

After the last iteration, the value B is ¥ to $A^E$ mod N, and C is the final value.

To clarify, we shall use the following example:
E=1011→E(1)=1;E(2)=0;E(3)=1;E(4)=1;

To find $A^{1011}$ modN;q=4
A*=$\mathcal{P}$(A·H)N=A·$I^{-2}$·I=A·$I^{-1}$ mod N
B=A*
FOR j=2 to q
B=$\mathcal{P}$(B·B)N which produces: $A^2(I^{-1})^2 \cdot I = A^2 \cdot I^{-1}$
E(2)=0; B=$A^2 \cdot I^{-1}$
j=3 B=$\mathcal{P}$(B·B)N=$A^2(I^{-1})^2 \cdot I = A^4 \cdot I^{-1}$
E(3)=1 B=$\mathcal{P}$(B·A*)N=$(A^4 \cdot I^{-1})(A \cdot I^{-1})I = A^5 \cdot I^{-1}$
j=4 B=$\mathcal{P}$(B·B)N=$A^{10} \cdot I^{-2} \cdot I = A^{10} \cdot I^{-1}$ As E(4) was odd, the last multiplication will be by A, to remove the parasitic $I^{-1}$.
B=$\mathcal{P}$(B·A)N=$A^{10} \cdot I^{-1} \cdot A \cdot I = A^{11}$
C=B A method for computing the H parameter by a reciprocal process is described in U.S. Pat. No. 5,513,133.

Figure 3:
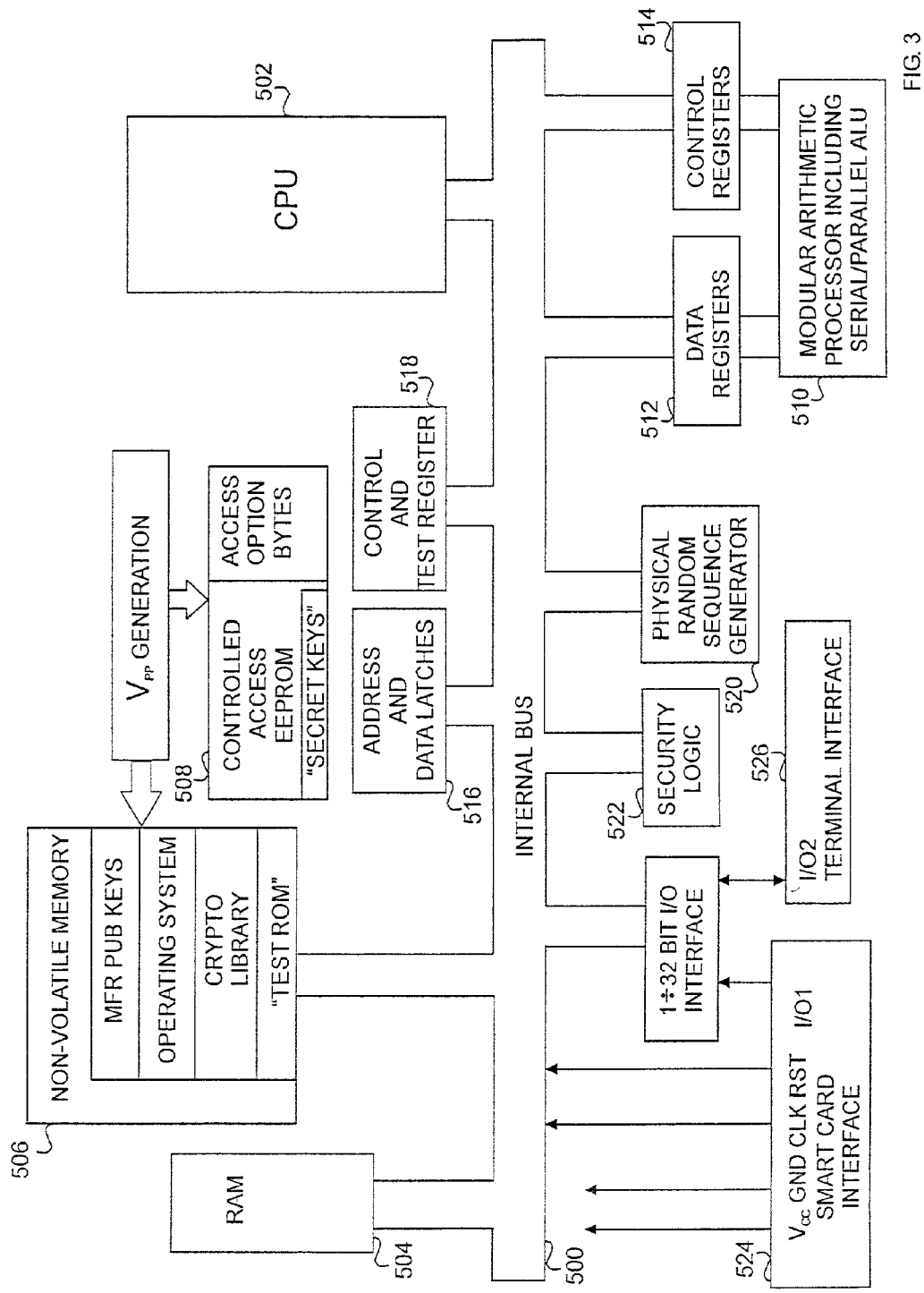
FIG. 3 is a simplified block diagram of a preferred embodiment of a complete single chip, monolithic crypto-computer, typically in smart cards.

Reference is now made to FIG. 3, which is a simplified block diagram showing how the present invention may be implemented in smart cards and other security devices. An internal bus, 500, links components including a CPU, 502, a RAM, 504, non-volatile memory, 506, controlled access EEPROM, 508, and modular arithmetic coprocessor, 510. As shown herein, the coprocessor, 510, is connected via data, 512, and control, 514, registers to the internal bus, 500.

The controlled access ROM, 508, is connected via address and data latch means, 516, and a control and test register, 518. Various other devices may be attached to the bus such as a physical sequence random generator, 520, security logic, 522, smart card and external port interfacing circuitry, 524, and 526, respectively.

When a cryptographic program, such as verifying an RSA signature is executed, it may require modular arithmetic functions such as modular exponentiation. The cryptographic program that calls the cryptographic function is preferably run on the CPU, 502.

Figure 4:
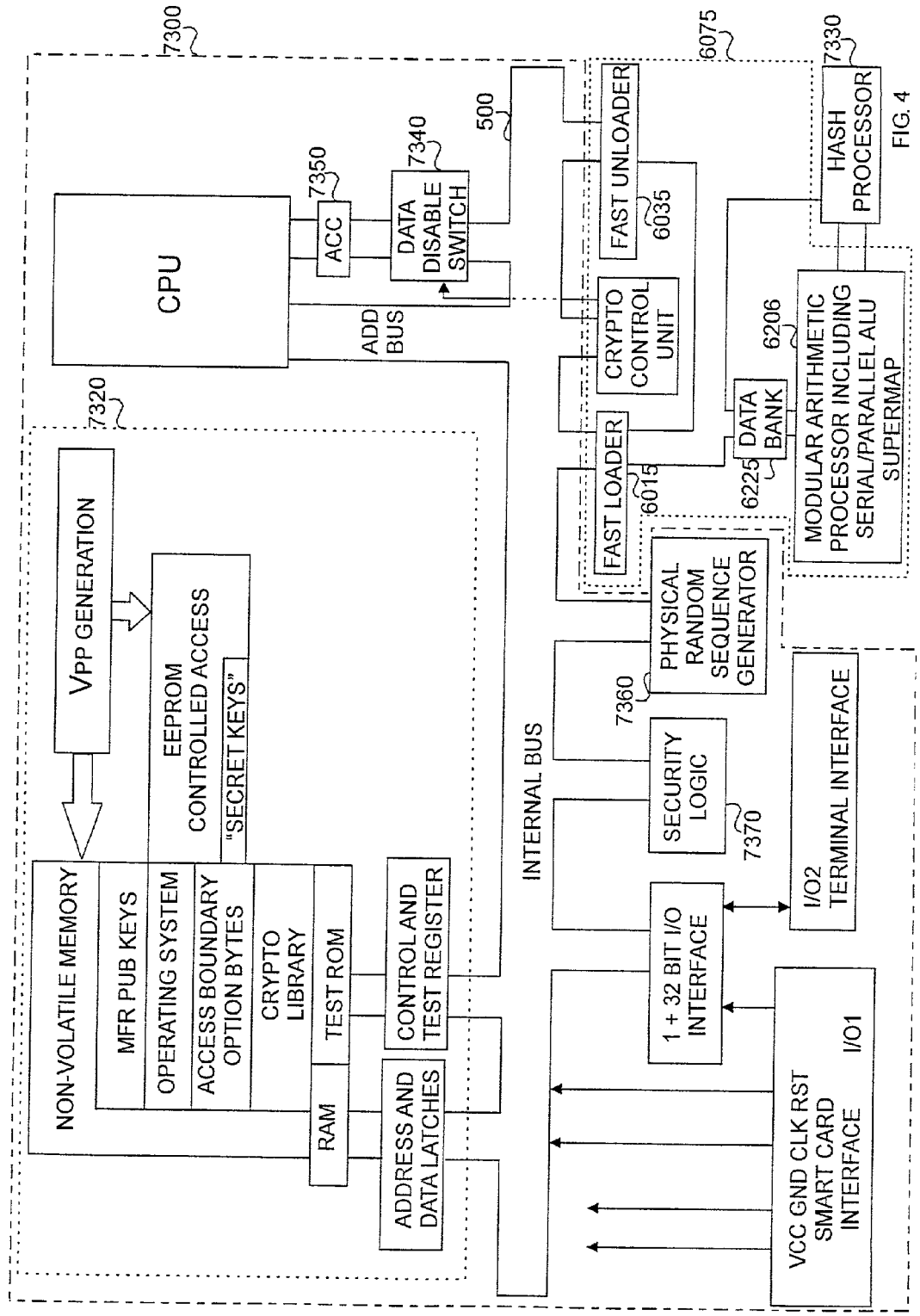
FIG. 4 is a simplified block diagram of a preferred embodiment of a complete single chip monolithic crypto-computer wherein a data disable switch is operative to provide for accelerated unloading of data from the operational unit.

Reference is now made to FIG. 4, which is another simplified block diagram of an implementation of the present invention for use in a smart card. Parts that are the same as those shown in FIG. 3 are given the same reference numerals and are not described again, except as necessary for an understanding of the present embodiment. In FIG. 4 the CPU 502 is shown with an external accumulator 7350. Data Disable Switch, 7340, detaches the CPU Accumulator from the Data Bus 500, while unloading data from the arithmetic coprocessor enables direct transfer of data from the SMAP to memory.

Figure 2:
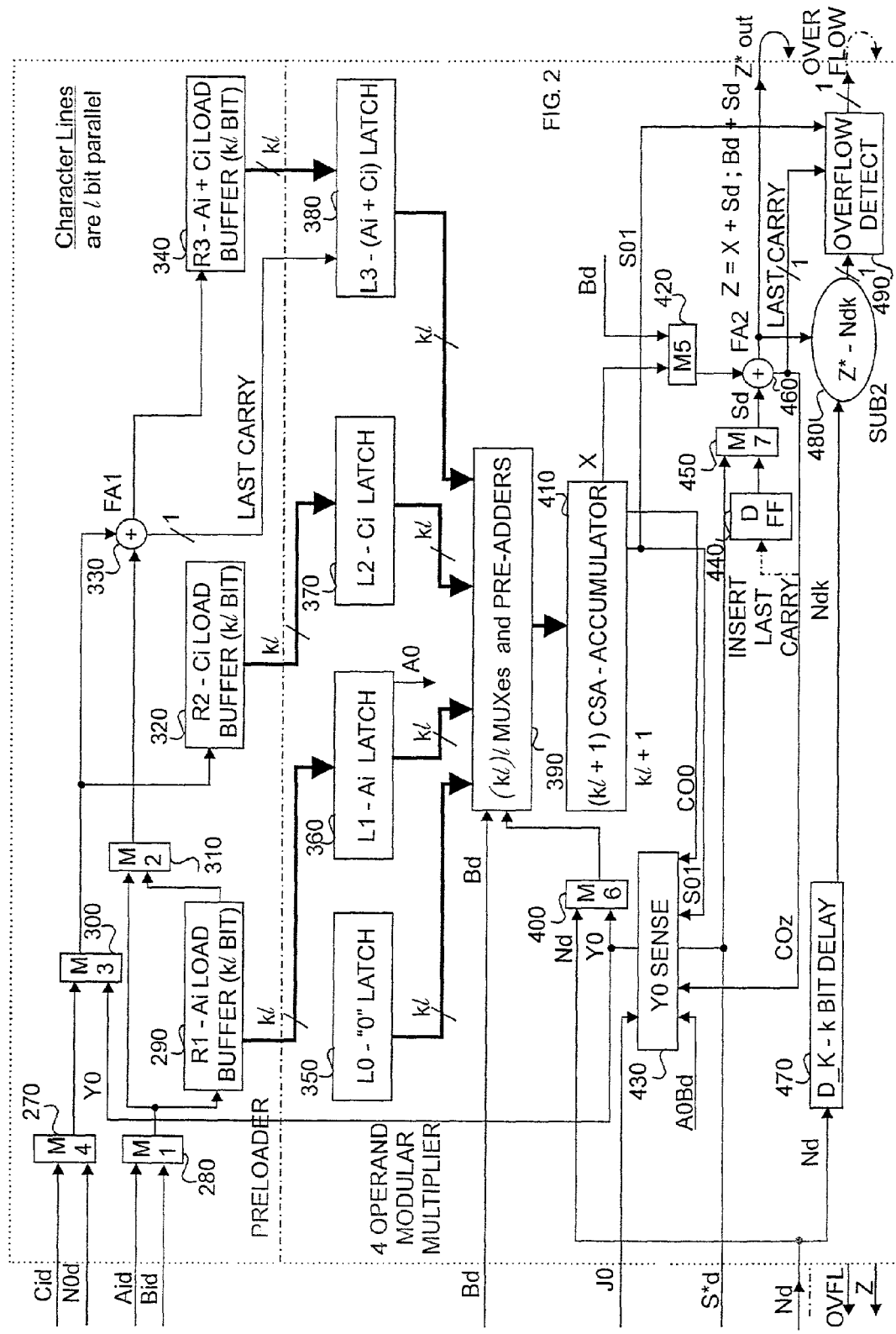
FIG. 2 is a block diagram of an embodiment of an operational unit operative to manipulate data from FIG. 1.
Figure 5:
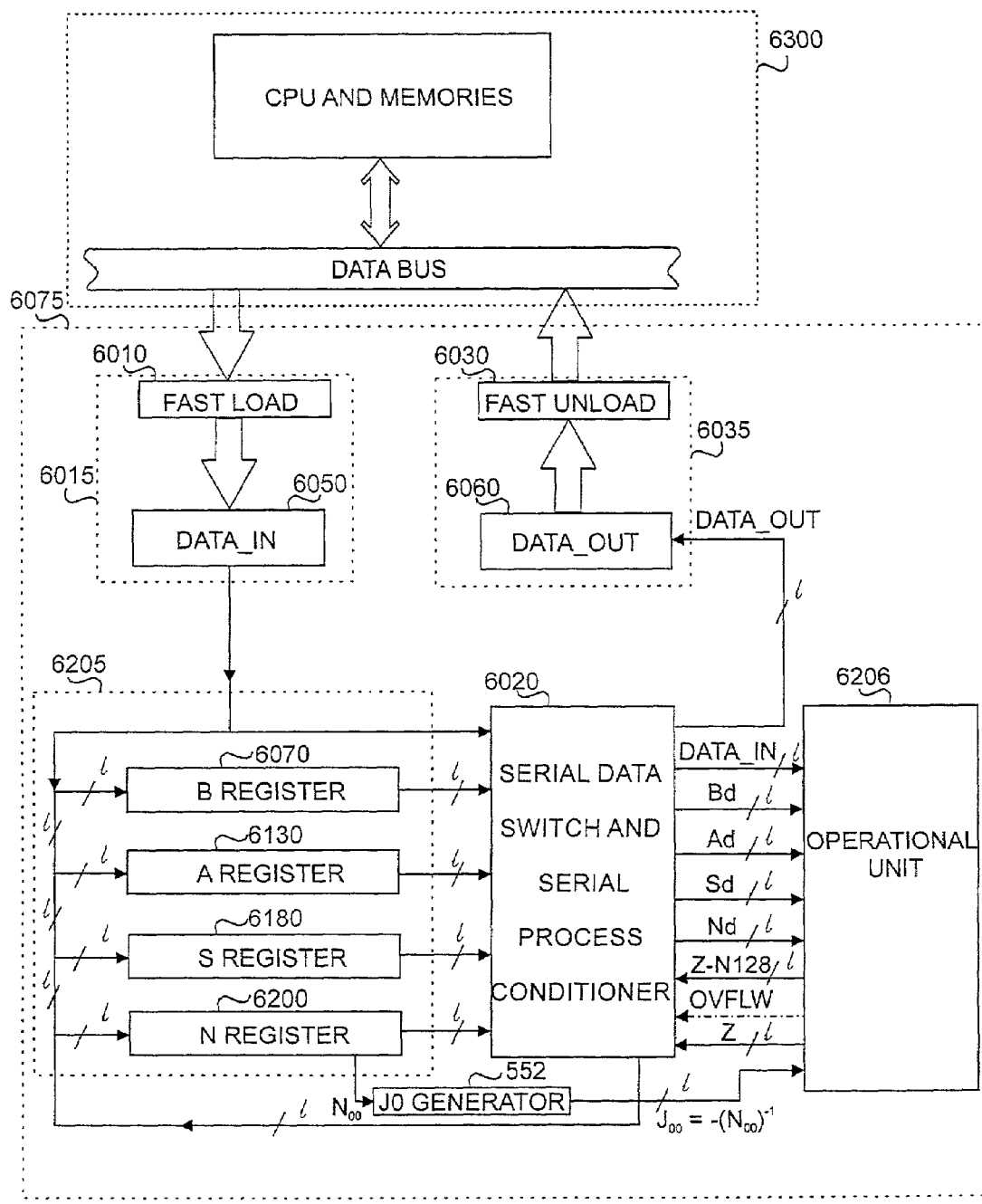
FIG. 5 is a simplified block diagram of a data register bank, operative to generate $J_0$.

FIG. 5 is a simplified block diagram of a preferred embodiment of a data register bank, 6205, within a coprocessor 6075, as depicted in coprocessors of FIGS. 2, 6 and 7, with a $J_0$ generator, wherein the $J_0$ generator typically compiles an l bit primary zero forcing function.

The coprocessor 6075 is connected to a data bus with a CPU as in previous figures. A register bank, 6205, comprises a B register 6070, an A register 6130, an S register 6180, and an N register 6200. The outputs of each of the registers are connected to a serial data switch and serial process conditioner 6020, which in turn is connected to an operational unit, 6206, which carries out the modular arithmetic operations. Connected between the N register, 6200, and the operational unit, 6206, is a $J_0$ generator, 552.

In the embodiment the $J_0$ generator compiles an l bit primary zero forcing function for use in the modular arithmetic functions described above.

FIG. 6 is a simplified internal block diagram of the operational unit of FIG. 5. The unit, preferably supports accelerated squaring operations, in that the additional $Y_0B_0$ serial buffer accepts $Y_0$ in the first phase, and in the second phase a modular reduced $B_0$ for a subsequent squaring operation, wherein it is found that B is larger than N.

Figure 7A:
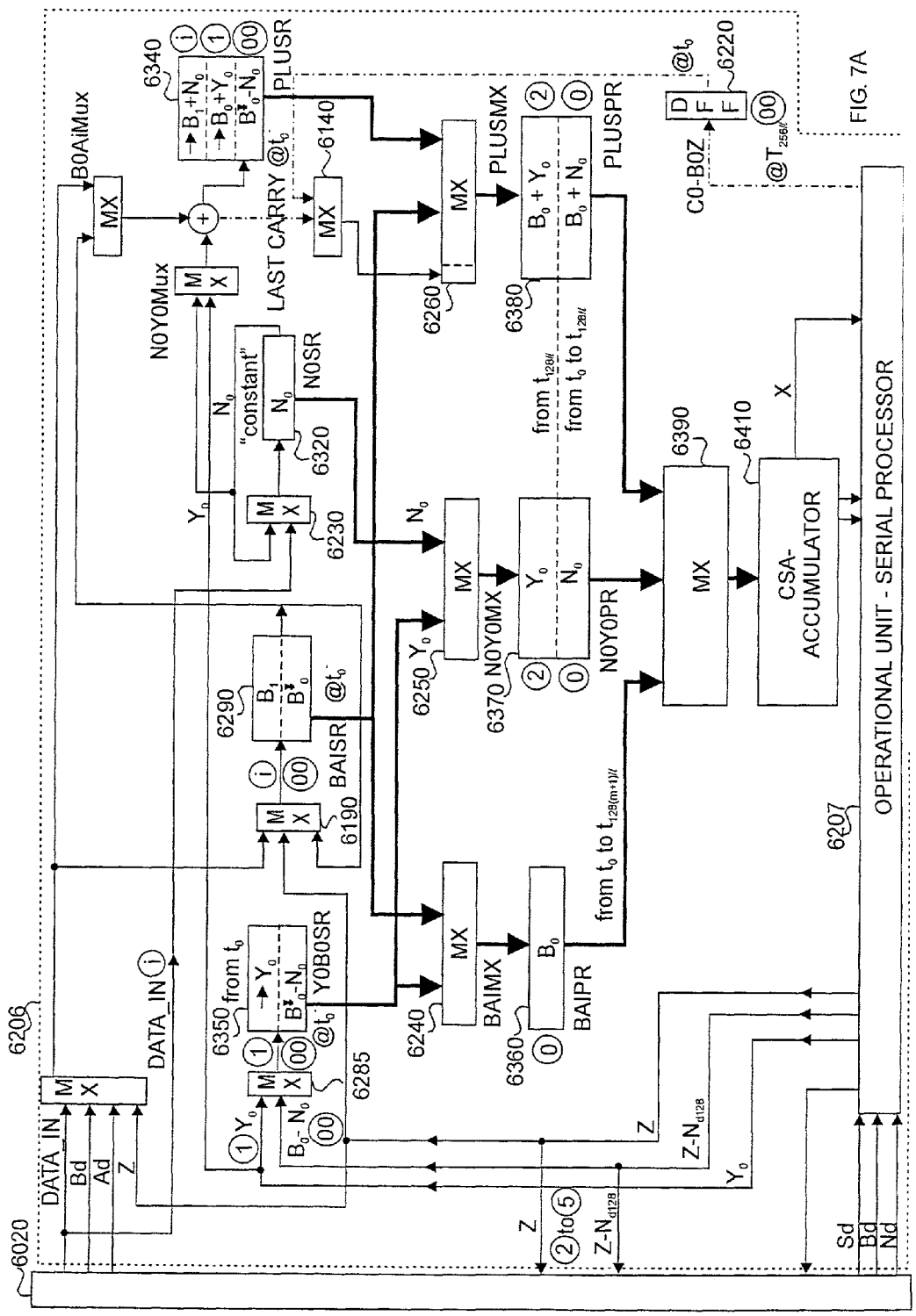
FIG. 7A is a block diagram of the main computational part of FIG. 6, with circled numbered sequence icons relating to the timing diagrams and flow charts of FIG. 7B, 7C, and FIG. 7D.

Reference is now made to FIG. 7A, which is a block diagram of the main computational part of the operational unit of FIG. 6. Numbers appearing in circles relate to the sequence diagrams of FIGS. 7B and 7D.

Figure 7B:
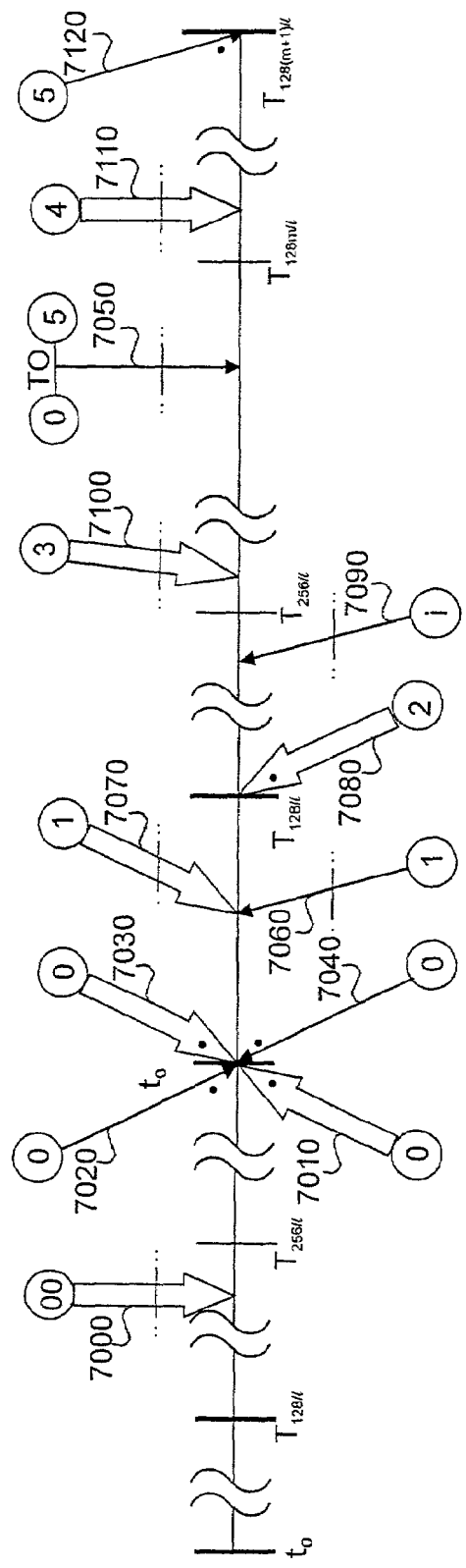
FIG. 7B is an event timing pointer diagram showing progressively the process leading to and including the first iteration of a squaring operation.

Reference is now made to FIG. 7B, which is an event timer pointer diagram showing progressively the process leading to and including the first iteration of a squaring operation.

Figure 7C:
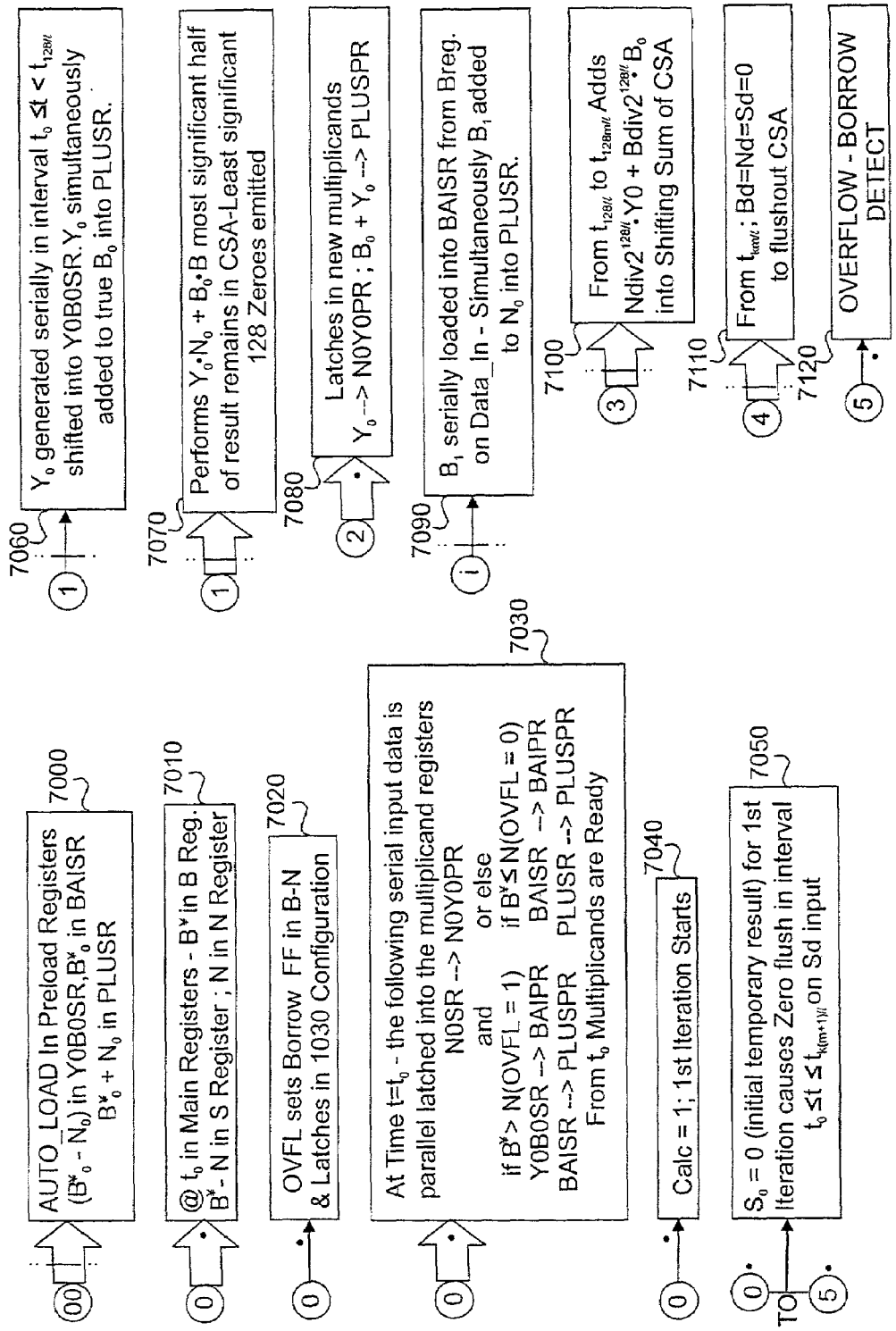
FIG. 7C is a detailed event sequence to eliminate the "Next Montgomery Squaring" delays in the first iteration of a squaring sequence iconed pointers relating to FIG. 7A, FIG. 7B, and FIG. 7D.

Reference is now made to FIG. 7C which is a generalized event sequence showing a method of eliminating the Next Montgomery Squaring delays in a first iteration of a squaring sequence. Circled numbers refer to FIGS. 7A, 7B and 7D.

Figure 7D:
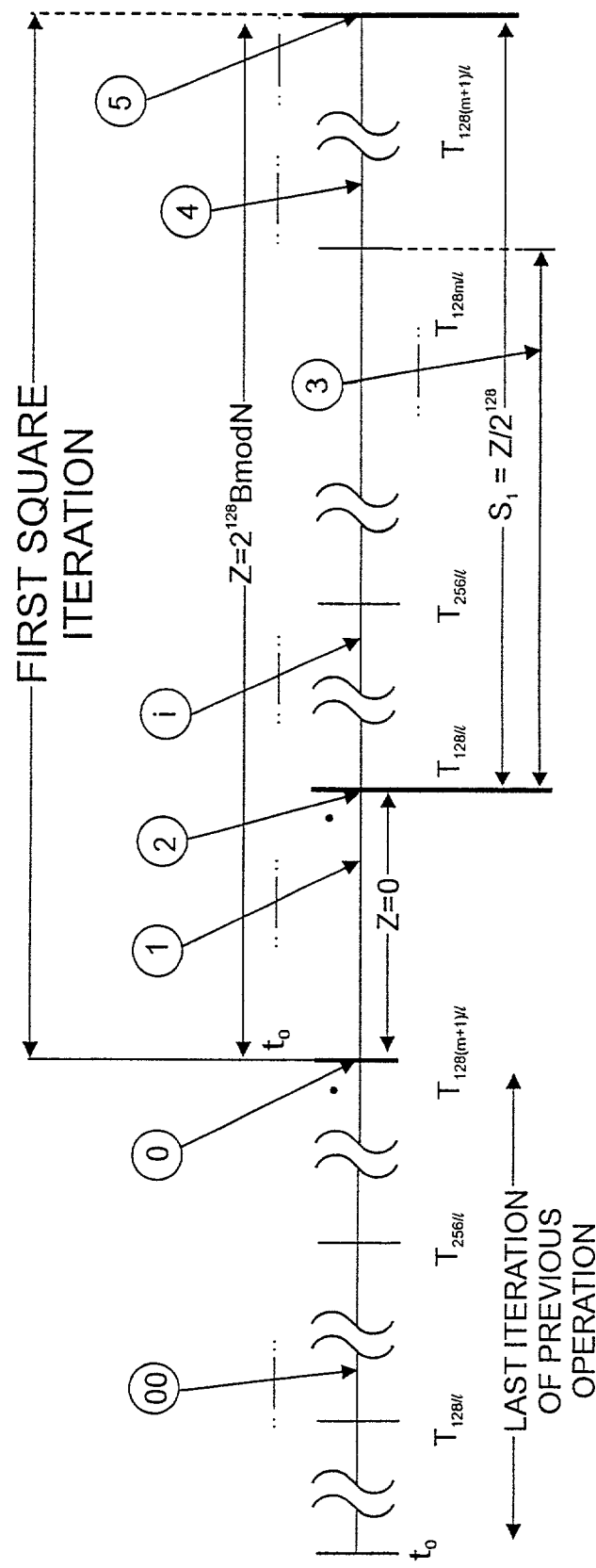
FIG. 7D illustrates the timing of the computational output, relating to FIG. 7A, 7B, and FIG. 7C.

Reference is now made to FIG. 7D which is a generalized event timer pointer diagram illustrating the timing of the computational output of the first iteration of a squaring operation.

Reference is now made to FIG. 8A, a set of look up tables, which typically show the choices of $J_0$, which is the negative of the multiplicative inverse over modulus $2^l$ of the right hand character of $N_0$. As $N_0$ is always either monic for $GF(2^q)$ or odd for GF(p), $J_0$ always exists.

In FIGS. 8A and 8B, we refer to this right hand character of the modulus as $N_0$. We refer to $N_{0j}$ as the j'th bit of the locally defined $N_0$ character FIG. 8B is a schematic for designing either a 4 bit or a 2 bit $Y_0$ zero forcing function character. The variable inputs into the force function are the $N_0$ bits (constant throughout a multiplication), the l, $S_0$ bits, and the l right hand bits of the product of the l multiplier and multiplicand bits, $A_{i0}$ and $B_{0j}$, and the carry switch, $\mathscr{S}$, which determines whether functions work in $GF(2^q)$ or $GF(p)$. The A and B bits are input into a $\otimes$ multiplier and $\oplus$ added to the $S_0$. When $\mathscr{S}=0$, all carries are disabled.

It is appreciated that various features of the invention, which are, for clarity, described in the contexts of separate embodiments, may also be provided in combination in a single embodiment. Conversely, various features of the invention, which are, for brevity, described in the context of a single embodiment, may also be provided separately or in any suitable subcombination.

It will be appreciated by persons skilled in the art, that the present invention is not limited to what has been particularly shown and described hereinabove. Rather, the scope of the present invention includes both combinations and subcombinations of the various features described hereinabove as well as variations and modifications thereof, which would occur to persons skilled in the art upon reading the foregoing description which are not in the prior art.

In the following claims, symbols such as have the meanings given in the preceding description.

The invention claimed is:

1. A microelectronic apparatus for performing $\otimes$ multiplication and squaring in both polynomial based $GF(2^q)$ and $GF(p)$ field arithmetic, squaring and reduction using a serial fed radix $2^l$ multiplier, B, with k character multiplicand segments, $A_i$, and a k character $\oplus$ accumulator wherein reduction to a limited congruence is performed "on the fly", in a systolic manner, with $A_i$, a multiplicand, times B, a multiplier, over a modulus, N, and a result being at most 2k+1 characters long, including the k first emitting disregarded zero characters, which are not saved, where k characters have no less bits than the modulus, the apparatus comprising;

a first (B), and second (N) main memory register means, each register operative to hold at least n bit long operands, respectively operative to store a multiplier value designated B, and a modulus, denoted N, wherein the modulus is smaller than $2^n$;

a digital logic sensing detector, Y0, operative to anticipate "on the fly" when a modulus value is to be $\oplus$ added to the value in the $\oplus$ adder accumulator device such that all first k characters emitting from the device are forced to zero;

a modular multiplying device for at least k character input multiplicands, with only one, at least k characters long $\oplus$ adder, $\oplus$ summation device operative to accept k character multiplicands, the $\otimes$ multiplication device operative to switch into the $\oplus$ accumulator device, in turn, multiplicand values, and in turn to receive multiplier values from a B register, and an "on the fly" simultaneously generated anticipated value as a multiplier which is operative to force k first emitting zero output characters in the first phase, wherein at each effective machine cycle at least one designated multiplicand is $\oplus$ added into the $\oplus$ accumulation device;

the multiplicand values to be switched in turn into the $\oplus$ accumulation device consisting of one or two of the following three multiplicands, a first multiplicand being an all-zero string value, a second multiplicand being the multiplicand $A_i$, and a third multiplicand being the $N_0$ segment of the modulus;

an apparatus to anticipate the l bit k character serial input $Y_0$ multiplier values;

the multiplier values which are input in turn into the multiplying device in the first phase being first the B operand, and concurrently, the second multiplier value consisting of the $Y_0$, "on the fly" anticipated k character string, to force first emitting zeroes in the output;

an $\oplus$ accumulation device, operative to output values simultaneously as multiplicands are $\oplus$ added into the $\oplus$ accumulation device;

an output transfer mechanism, in the second phase operative to output a final modular $\otimes$ multiplication result from the $\oplus$ accumulation device, wherein all addition, accumulation and multiplication operations are switchable to be performed either with carries or without carries, over $GF(p)$ or over $GF(2^q)$.

2. An apparatus as in claim 1 wherein $\oplus$ summations into the $\oplus$ accumulation device are activated by each new serially loaded higher order multiplier characters.

3. An apparatus as in claim 1, wherein the multiplier characters;

are operative to cause no $\oplus$ summation into the $\oplus$ accumulation device if both the input B character and the corresponding input $Y_0$ character are zeroes;

are operative to $\oplus$ add in only the $A_i$ multiplicand if the input B character is a one and the corresponding $Y_0$ character is a zero;

are operative to $\oplus$ add in only the N, modulus, if the B character is a zero, and the corresponding $Y_0$ character is a one; and are operative to $\oplus$ add in the $\oplus$ summation of the modulus, N, with the multiplicand $A_i$ if both the B input character and the corresponding $Y_0$ character are ones.

4. An apparatus as in claim 1, operative to preload multiplicand values $A_i$ and N, into two designated preload buffers, and to $\oplus$ summate these values into a third multiplicand preload buffer, obviating the necessity of $\oplus$ adding in each multiplicand value separately.

5. An apparatus as in claim 1, wherein the multiplier values are serial single character in input and the output of the $\oplus$ accumulation device is serial single character output, wherein the $Y_0$ detect device is operative to anticipate only one character in a clocked turn.

6. An apparatus as in claim 1, wherein the $\oplus$ accumulation device performs modulo 2, XOR addition/subtraction, wherein all carry bits in addition and subtraction components are disregarded, thereby precluding provisions for overflow and further limiting convergence in computations.

7. A $\otimes$ multiplication apparatus as in claim 1 wherein all carry inputs are disabled to zero, denoted, S=0, typically operative to perform polynomial based multiplication.

8. An apparatus as in claim 1 wherein an S equal to zero acting on an element in a circuit equation computing in $GF(2^q)$, the S designates omitted circuitry and all adders and subtractors, designated $\oplus$ have been reduced to XOR, modulo 2 addition/subtraction elements.

9. An apparatus as in claim 1 wherein k first emitting zeroes will egress from the device controlled by the following four quantities in anticipating the next in turn $Y_0$ character:

i. the l bit $S_{out}$ bits of the result of the l bit by l bit mod $2^l$ $\otimes$ multiplication of the right-hand character of the $A_i$ register times the $B_d$ character of the B Stream, $A_o \cdot B_d$ mod $2^l$;

ii. the first emitting carry out character from the ⊕ accumulation device, $S(CO_0)$;

iii. the l bit $S_{out}$ character from the second from the right character emitting cell of the ⊕ accumulation device, $SO_1$;

iv. the l bit $J_0$ value, which is the negative multiplicative inverse of the right-hand character in the $N_0$ modulus multiplicand register;

wherein values, $A_0 \cdot B_d \bmod 2^l$, $S(CO_0)$, and $SO_1$ are ⊕ added character to character together and "on the fly" multiplied by the $J_0$ character to output a valid $Y_0$ zero-forcing anticipatory character to force an l bit egressing string of zeroes.

10. An apparatus as in claim 1, wherein ⊗ multiplication on polynomial based operands is performed in a reverse mode, multiplying from right hand MS characters to left hand LS characters, operative to perform modular reduced ⊗ multiplication without Montgomery type parasitic functions.

11. An apparatus as in claim 1 where the preload buffers are serially fed and where multiplicand values are preloaded into the preload buffers on the fly from a multiplicity of memory devices.

12. An apparatus as in claim 1, wherein a previous value, emitting from an additional n bit register, S, is ⊕ summated into the output value of the ⊕ accumulation device via an l bit ⊕ adder circuit such that first emitting output characters are zeroes when the $Y_0$ detector is operative to detect the necessity of ⊕ adding moduli to the ⊕ summation in the ⊕ accumulation device, wherein the $Y_0$ detector is operative to detect utilizing the next in turn ⊕ added characters $A_0 \cdot B_d \bmod 2^l$, $S(CO_0)$, $SO_1$, $S_d$ and $S(CO_z)$, the composite of ⊕ added characters to be finite field ⊗ multiplied on the fly by the l bit $J_0$ value, where ⊕ defines the addition and ⊗ defines the multiplication as befits the finite field used in the process.

13. An apparatus as in claim 1, wherein for l=1, $J_0$ is implicitly 1, and the $J_0$ ⊗ multiplication is implicit, without additional hardware.

14. An apparatus as in claim 1 wherein a comparator is operative to sense a finite field output from the ⊗ modular multiplication device, working in GF(p), where the first right hand emitting k zero characters are disregarded, where the output is larger than the modulus, N, thereby operative to control a modular reduction whence said value is output from the memory register to which the output stream from the multiplier device is destined, and thereby precluding allotting a second memory storage device for the smaller product values.

15. A device as in claim 1 wherein for ⊗ modular multiplication in the $GF(2^q)$, the apparatus is operative to multiply without an externally precomputed more than l bit zero-forcing factor.

16. A method according to claim 1 operative to compute a $J_0$ constant by resetting either the A operand value or the B operand value to zero and setting the partial result value, $S_0$, to 1.

17. A microelectronic apparatus for performing interleaved finite field ⊗ modular multiplication of integers A and B operative to generate an output stream of A times B modulus N wherein n the number of characters in the modulus operand register is larger than k, wherein the ⊗ multiplication process is performed in iterations, wherein at each interleaved iteration with operands input into a ⊗ multiplying device, consisting of N, the modulus, B, a multiplier, a previously computed partial result, S, and a k character string segment of A, a multiplicand, the segments progressing from the $A_0$ string segment to the $A_{m-1}$ string segment, wherein each iterative result is ⊕ summated into a next in turn S, temporary result, in turn, wherein first emitting characters of iterative results are zeroes, the apparatus comprising:

first (B), second (S) and third (N) main memory registers, each register capable of storing and outputting operands, respectively operative to store a multiplier value, a partial result value and a modulus, also denoted N;

a modular multiplying device operative to ⊕ summate into the ⊕ accumulation device, in turn one or two of a plurality of multiplicand values, in turn, during the phases of the iterative ⊗ multiplication process, and in turn to receive as multipliers, in turn, inputs from a first value B register, second, from an "on the fly" anticipating value, $Y_0$, as a multiplier to force first emitting right-hand zero output characters in each iteration, and third values from the modulus, N, register;

the multiplicand parallel registers operative at least to receive in turn, values from the A, B, and N register sources, and in turn, also a multiplicand zero forcing $Y_0$, value;

a first emitting zero forcing $Y_0$ detect device operative to generate a binary string operative to be a multiplier during the first phase and operative to be a multiplicand in the second phase;

multiplicand values to be switched into the accumulation device for the first phase consisting of a first zero value, a second value, $A_i$, which is a k character string segment of a multiplicand, A, and a third value $N_0$, being the first emitting k characters of the modulus, N;

a temporary result value, S, resulting from a previous iteration, operative to be summated with the value emanating from the accumulation device, to generate a partial result for the next in turn iteration;

multiplicand values to be input, in turn, into the accumulation device for the second phase being, a first zero value, a second $A_i$ operand, remaining in place from the first phase, and a third $Y_0$ value having been anticipated in the first phase;

multiplier values input into the multiplying device in the first phase being a first emitting string, $B_0$, being the first emitting string segment of the B operand, concurrently multiplying with the second multiplier value consisting of the anticipated $Y_0$ string which is simultaneously loaded character by character as it is generated into a preload multiplicand buffer for the second phase;

the two multiplier values input into the apparatus during the second phase being the left hand n−k character values from the B operand, designated B, and the left hand n−k characters of the N modulus, designated N, respectively; and a multiplying flush out device operative in the last phase to transfer the left hand segment of a result value remaining in the accumulation device into a result register, wherein multiplication on polynomial based operands is performed in a reverse mode, multiplying from MS characters to LS characters, operative to perform modular reduction without Montgomery type parasitic functions.

18. An apparatus according to claim 17 operative to anticipate the $Y_0$ value using first emitting values of the multiplicand, and present inputs of the B multiplier, carry out values from the accumulation device, summation values from the accumulation device, the present values from the previously computed partial result, and carry out values from an adder which summates the result from the accumulation device with the previous partial result.

19. An apparatus as in claim 18 wherein k first emitting zeroes will egress from the device controlled by the following six quantities in anticipating the next in turn $Y_0$ character:
   i. the l bit $S_{out}$ bits of the result of the l bit by l bit mod $2^l$ multiplication of the right-hand character of $A_i$ times the $B_d$ character of the B operand, $A_0 \cdot B_d$ mod $2^l$;
   ii. the first emitting carry out character from the accumulation device, $S(CO_0)$;
   iii. the l bit $S_{out}$ character from the second from the right-hand character emitting cell of the accumulation device, $SO_1$;
   iv. the next in turn character value from the S stream, $S_d$;
   v. the l bit carry out character from the Z output full adder, $S(CO_z)$;
   vi. the l bit $J_0$ value, which is the negative multiplicative inverse of the right-hand character in the $N_0$ modulus multiplicand register;
   wherein values, $A_0 \cdot B_d$ mod $2^l$, $S(CO_0)$, $SO_1$, $S_d$ are added character to character together and "on the fly" multiplied by the $J_0$ character to output a valid $Y_0$ zero-forcing anticipatory character to force an l bit egressing character string of zeroes.

20. An apparatus as in claim 17 comprised of at least one sensor operative to compare the output result to N, the modulus, the mechanism operative to actuate a second subtractor on the output of the result register, thereby to output a modular reduced value which is limited congruent to the output result value precluding the necessity to allot a second memory storage for a smaller result.

21. An apparatus as in claim 17 where a value which is a summation of two multiplicands is loaded into a preload character buffer with at least a k characters memory means register concurrently whilst one of the values is loaded into a preload buffer.

22. An apparatus with only one accumulation device, and an anticipating zero forcing mechanism operative to perform a series of interleaved modular multiplications and squarings concurrently performing the equivalent of three natural integer multiplication operations, such that a result is an exponentiation.

23. An apparatus as in claim 17 where next in turn used multiplicands are preloaded into preload register buffer means on the fly.

24. An apparatus as in claim 17 where a value which is a summation of two multiplicands is summated into at least a k character register concurrently whilst one of the values is loaded into its preload buffer.

25. An apparatus as in claim 17 wherein apparatus buffers and registers are operative to be loaded with values from external memory sources and said buffers and registers are operative to be unloaded into the external memory source during computations, such that the maximum size of the operands is dependent on available memory means.

26. An apparatus as in claim 17 wherein memory register means are typically serial single character in/serial single character out, parallel at least k characters in/parallel at least k characters out, serial single character in/parallel at least k characters out, and parallel k characters in/serial single character out.

27. An apparatus as in claim 17 wherein the final phase of a multiplication type iteration, the multiplier inputs are zero characters operative to flush out the left hand segment of the carry save accumulator memory.

28. An apparatus as in claim 17 where next in turn used multiplicands are preloaded into preload memory buffers on the fly.

29. An apparatus as in claim 17 where multiplicand values are preloaded into the preload buffers on the fly from central storage memory means.

30. A microelectronic apparatus for performing modular multiplication, squaring and reduction, the apparatus multiplying a multiplicand A by a multiplier B over a modulus N, wherein B is a serial fed radix $2^l$ multiplier comprising no more than k character multiplier segments, A comprises no more than k character multiplicand segments, and N has no more than k characters, each character having l bits, the apparatus comprising:
   a first (B) register operative to store the multiplier B;
   a modular multiplication device accepting multiplicands having no more than k characters, the modular multiplication device including a single accumulation device at least k characters long and operative to repeatedly receive a multiplicand and simultaneously output a character;
   a digital logic sensing detector operative to anticipate that a non-zero character would be about to be output from the single accumulation device and to determine a number of times, $Y_0$, that the modulus N should be added into the single accumulation device so as to force the non-zero character to zero,
   the modular multiplication device operative, during a first phase, to switch into the single accumulation device, in turn, multiplicand values, and to receive, character by character, the contents of the B register and the $Y_0$ value from the digital logic sensing detector, thereby to force up to k first output characters which are zero, the multiplicand values switched in turn into the accumulation device comprising less than 3 of the following three multiplicands: (a) an all-zero string value; (b) a portion of the multiplicand A; and (c) at least a portion of the modulus N; and
   an output transfer mechanism, operative in a last phase to unload at least a portion of a final modular multiplication result from the accumulation device,
   wherein all addition, accumulation and multiplication operations are switchable to be performed either with carries or without carries, over GF(p) or over GF($2^q$).

31. Apparatus according to claim 30 for performing interleaved modular multiplication and reduction in a plurality of interleaved iterations, wherein the $Y_0$ value used in the first phase is saved, and wherein said portion of the modulus N comprises a k-character least significant portion thereof,
   the apparatus also comprising a second (S) register operative to store a temporary result S from an iteration I for use during a subsequent iteration i+1 and a third (N) register operative to store the modulus N, wherein n, the number of characters in the third (N) register, is larger than k;
   the modular multiplication device being operative, in a first phase, to multiply a plurality of slices of A during the plurality of interleaved iterations respectively, by B,
   the modular multiplication device being operative, during a second phase between the first and last phases, to switch into the single accumulation device, in turn, multiplicand values, and to receive multiplier values from the B and N registers, the multiplicand values switched in turn into the accumulation device comprising less than 3 of the following three multiplicands: (a)

an all-zero string value; (b) a portion of the multiplicand A; and (c) the $Y_0$ value as saved from the first phase;

the apparatus also comprising a serial addition device operative, during each iteration, to summate the temporary result value S in the second (S) register with the character output by the accumulation device, thereby to generate n–k least significant characters of a new temporary result, which characters are stored in the second (S) register, for the next in turn iteration.

32. Apparatus according to claim 30 which employs $Y_0$ as the next character of a polynomial based modular reducing quotient deterministically.

33. An apparatus as in claim 30 wherein the digital logic sensing detector is operative to receive the following four inputs:
   i. the product of the least significant character in the A register multiplied by a current value from the B register, in modulus $2^l$;
   ii. the first emitted carry out character from the accumulation device;
   iii. the contents of the second from the right character in the accumulation device;
   iv. the negative multiplicative inverse of the right-hand character in the N register.

34. An apparatus as in claim 31 wherein the digital logic sensing detector is operative to receive the following six inputs:
   i. the product of the least significant character in the A register multiplied by a current value from the B register, in modulus $2^l$;
   ii. the first emitted carry out character from the accumulation device;
   iii. the contents of the second from the right character in the accumulation device;
   iv. the negative multiplicative inverse of the right-hand character in the N register;
   v. the next in turn character in the S register; and vi. the carry out character from the serial addition device.

35. A method for performing modular multiplication, squaring and reduction, including multiplying a multiplicand A by a multiplier B over a modulus N, wherein B is a serial fed radix $2^l$ multiplier comprising no more than k character multiplier segments, A comprises no more than k character multiplicand segments, and N has no more than k characters, each character having l bits, the method comprising:

storing a multiplier B in a first (B) register;

providing a modular multiplication device accepting multiplicands having no more than k characters, the modular multiplication device including a single accumulation device at least k characters long and operative to repeatedly receive a multiplicand and simultaneously output a character;

anticipating that a non-zero character would be about to be output from the single accumulation device and determining a number of times, $Y_0$, that the modulus N should be added into the single accumulation device so as to force the non-zero character to zero, during a first phase, switching into the single accumulation device, in turn, multiplicand values, and receiving, character by character, the contents of the B register and the $Y_0$ value from the digital logic sensing detector, thereby to force up to k first output characters which are zero, the multiplicand values switched in turn into the accumulation device comprising less than 3 of the following three multiplicands: (a) an all-zero string value; (b) a portion of the multiplicand A; and (c) at least a portion of the modulus N; and in a last phase, unloading a final modular multiplication result from the accumulation device, wherein all addition, accumulation and multiplication operations are switchable to be performed either with carries or without carries, over GF(p) or over GF($2^q$).

36. A method according to claim 35 for performing interleaved modular multiplication and reduction in a plurality of interleaved iterations, wherein the $Y_0$ value used in the first phase is saved, and wherein said portion of the modulus N comprises a k-character least significant portion thereof, the method also comprising:

providing a second (S) register operative to store a temporary result S from an iteration i for use during a subsequent iteration i+1 and a third (N) register operative to store the modulus N, wherein n, the number of characters in the third (N) register, is larger than k;

the modular multiplication device being operative, in the first phase, to multiply a plurality of slices of A during the plurality of interleaved iterations respectively, by B, the modular multiplication device being operative, during a second phase between the first and last phases, to switch into the single accumulation device, in turn, multiplicand values, and to receive multiplier values from the B and N registers, the multiplicand values switched in turn into the accumulation device comprising less than 3 of the following three multiplicands: (a) an all-zero string value; (b) a portion of the multiplicand A; and (c) the $Y_0$ value as saved from the first phase, the method also comprising summating, during each iteration, the temporary result value S in the second (S) register with the character output by the accumulation device, thereby to generate a new temporary result, for the next in turn iteration.

37. A method according to claim 35 which deterministically employs $Y_0$ as the next character of a polynomial based modular reducing quotient.

* * * * *